(12) United States Patent　　　(10) Patent No.:　US 12,628,216 B2

Hwang et al.　　　　　　　　　　(45) Date of Patent:　May 12, 2026

(54) LINK SETTING METHOD AND DEVICE FOR MULTI-LINK TRANSMISSION IN WIRELESS LAN COMMUNICATION SYSTEM

(71) Applicants:ELECTRONICS AND TELECOMMUNICATIONS RESEARCH INSTITUTE, Daejeon (KR); KOREA NATIONAL UNIVERSITY OF TRANSPORTATION INDUSTRY-ACADEMIC COOPERATION FOUNDATION, Chungju-si (KR)

(72) Inventors: Sung Hyun Hwang, Daejeon (KR); Kyu Min Kang, Daejeon (KR); Jae Cheol Park, Daejeon (KR); Jin Hyung Oh, Sejong (KR); Su Na Choi, Daejeon (KR); Yong Ho Kim, Incheon (KR); Han Seul Hong, Seoul (KR)

(73) Assignees: Electronics and Telecommunications Research Institute, Daejeon (KR); Korea National University of Transportation Industry-Academic Cooperation Foundation, Chungju-si (KR)

( * ) Notice: Subject to any disclaimer, the term of this patent is extended or adjusted under 35 U.S.C. 154(b) by 306 days.

(21) Appl. No.: 17/624,248

(22) PCT Filed: Jul. 10, 2020

(86) PCT No.: PCT/KR2020/009074

§ 371 (c)(1),
(2) Date: Dec. 30, 2021

(87) PCT Pub. No.: WO2021/010663

PCT Pub. Date: Jan. 21, 2021

(65) Prior Publication Data

US 2022/0287121 A1　　Sep. 8, 2022

(30) Foreign Application Priority Data

Jul. 12, 2019　(KR) ........................ 10-2019-0084739
Sep. 16, 2019　(KR) ........................ 10-2019-0113800
Jul. 8, 2020　(KR) ........................ 10-2020-0084148

(51) Int. Cl.
*H04W 76/15*　　　(2018.01)
*H04W 74/0833*　　(2024.01)
*H04W 84/12*　　　(2009.01)

(52) U.S. Cl.
CPC ......... *H04W 76/15* (2018.02); *H04W 74/085* (2013.01); *H04W 84/12* (2013.01)

(58) Field of Classification Search
CPC .... H04W 76/15; H04W 74/085; H04W 84/12
See application file for complete search history.

(56) References Cited

U.S. PATENT DOCUMENTS 8,842,624 B2　9/2014　Trachewsky
2011/0149724 A1　6/2011　Lee et al.
(Continued)

FOREIGN PATENT DOCUMENTS

KR　　1020180115724 A　10/2018
WO　　2010134737 A2　11/2010
(Continued)

OTHER PUBLICATIONS

Po-Kai Huang et al., "Extremely Efficient Multi-band Operation", May 14, 2019, doc.: IEEE 802.11-19/0822r0.
(Continued)

*Primary Examiner* — Michael Thier
*Assistant Examiner* — Nevena Zecevic Sandhu
(74) *Attorney, Agent, or Firm* — Rabin & Berdo, P.C.

(57) ABSTRACT

The present invention relates to an operating method of a first communication node in a communication system, com-
(Continued)

prising the steps of: negotiating with a second communication node with respect to a parameter for multi-link transmission; determining, on the basis of the parameter, a plurality of links for performing the multi-link transmission, and the transmission method by which the multi-link transmission is performed; and transmitting, in the plurality of links, a data frame to the second communication node by means of the transmission method. Therefore, the communication node can efficiently set and change links.

15 Claims, 23 Drawing Sheets

(56) References Cited

U.S. PATENT DOCUMENTS

| | | | |
|---|---|---|---|
| 2012/0243494 A1 | 9/2012 | Trachewsky | |
| 2013/0188747 A1 | 7/2013 | Cheong et al. | |
| 2013/0288694 A1* | 10/2013 | Mochizuki | H04W 72/04 |
| | | | 455/450 |
| 2015/0230263 A1 | 8/2015 | Roy et al. | |
| 2016/0353417 A1 | 12/2016 | Kim et al. | |

| | | | |
|---|---|---|---|
| 2018/0206190 A1 | 7/2018 | Cherian et al. | |
| 2018/0317242 A1 | 11/2018 | Park et al. | |
| 2019/0021025 A1 | 1/2019 | Ahn et al. | |
| 2019/0124657 A1 | 4/2019 | Kim et al. | |
| 2019/0150214 A1 | 5/2019 | Zhou et al. | |
| 2019/0158385 A1 | 5/2019 | Patil et al. | |
| 2019/0268812 A1* | 8/2019 | Li | H04W 36/04 |
| 2020/0274656 A1* | 8/2020 | Gordaychik | H04L 1/1671 |
| 2021/0211908 A1* | 7/2021 | Jiang | H04L 5/0051 |
| 2022/0201538 A1* | 6/2022 | Lee | H04W 28/0257 |
| 2022/0329482 A1* | 10/2022 | Xiao | H04W 40/244 |

FOREIGN PATENT DOCUMENTS

| | | | |
|---|---|---|---|
| WO | 2014123349 A1 | 8/2014 |
| WO | 2018034458 A1 | 2/2018 |

OTHER PUBLICATIONS

Yongho Seok et al., "EHT Multi-link Operation", May 16, 2019, doc.: IEEE 802.11-19/0731r0.

Yunbo Li et al., "Channel Access in Multi-band operation", Jul. 10, 2019, doc.: IEEE 802.11-19/1116r0.

* cited by examiner

Link 1

Link 2

Link 1

Link 2

| Element ID | length | element ID extension | new primary link information | | previous primary link information | | link appliance timer | link appliance timeout | beacon information | | reassociation request | new AID |
|---|---|---|---|---|---|---|---|---|---|---|---|---|
| | | | link ID | activation | link ID | activation | | | beacon interval | TBTT | | |

LINK SETTING METHOD AND DEVICE FOR MULTI-LINK TRANSMISSION IN WIRELESS LAN COMMUNICATION SYSTEM

TECHNICAL FIELD

The present invention relates to a method and an apparatus for link configuration for multi-link transmission in a wireless LAN communication system, and more specifically, to a method, an apparatus, and a system for configuring a primary link in multi-link transmission.

BACKGROUND ART

Recently, with the spread of mobile devices, wireless LAN (WLAN) technology, which can provide fast wireless Internet service to them, is getting much attention. The WLAN technology is a technology that enables mobile devices such as smart phones, smart pads, laptop computers, portable multimedia players, and embedded devices to wirelessly connect to the Internet based on wireless communication technology at a short range.

The standards using the WLAN are mainly developed as the Institute of Electrical and Electronics Engineers (IEEE) 802.11 standards by the IEEE. The IEEE 802.11 standards were developed and progressed in a way of revising them through later versions starting with the initial version supporting 1-2 mega bits per second (Mbps). The IEEE 802.11a revised version supports up to 54 Mbps by using an orthogonal frequency division multiplexing (OFDM) scheme in a 5 GHz band, and the IEEE 802.11b supports transmission rates of up to 11 Mbps in a 2.4 GHz band in which the initial version operates by utilizing a direct sequence spread spectrum (DSSS) scheme.

Then, due to a demand for higher speed, the revised version of IEEE 802.11n, which includes high throughput (HT) WLAN technologies, operates in the OFDM scheme, and was developed to improve the maximum transmission rate by using a channel bandwidth extension and multiple input multiple output (MIMO) in the 2.4 GHz band and 5 GHz band. As a result, when using 4 spatial steams and 40 MHz bandwidth, the maximum transmission rate has been improved to support up to 600 Mbps.

As the WLAN technology has been developed and spread, applications utilizing the WLAN technology have been diversified, and a demand for a WLAN technology supporting a higher throughput has arisen. Accordingly, a very high throughput (VHT) WLAN technology, which further expands a used frequency bandwidth (up to 160 MHz or 80+80 MHz) and extends the number of supported spatial streams to support a high throughput of 1 giga bits per second (Gbps) or more, has been applied to the IEEE 802.11ac revised version. In addition, the corresponding standard supports downlink transmission to multiple terminals by using the MIMO. Also, as the demand for the WLAN technology increases further, the revised version of IEEE 802.11ax has been developed to utilize multi-user (MU) MIMO and orthogonal frequency division multiple access (OFDMA) even for uplink by using a MU-OFDMA based transmission procedure.

Recently, as applications that require higher throughput and applications that require real-time transmission have occurred, an extreme high throughput (EHT) WLAN technology has been proposed, and development to enact a revision of the IEEE 802.11be is currently being progressed. The standard aims to support a high throughput of 30 Gbps, and it was agreed to introduce an operation of reducing a frame transmission delay. In the corresponding standard, a further wider frequency bandwidth (e.g., 320 MHz, etc.), multi-link transmission and aggregation operations including operations using multiple bands, and techniques such as multiple access point (AP) transmission operations and efficient retransmission operations (e.g., hybrid automatic repeat request (HARQ)) have been proposed as main functions.

However, the multi-link operation is an operation that has not been defined in the conventional WLAN standards. Therefore, in order to perform the corresponding operation, it may be necessary to negotiate a link configuration and a transmission scheme between an AP multi-link device (MLD) and a station (STA) MLD performing the multi-link operation. In addition, it may be necessary to define a method of configuring a primary link among multiple links and a method of changing the primary link. In this case, fairness with conventional STAs using a different band may need to be considered to perform the corresponding operation. Further, since different operations may be performed depending on whether each STA is equipped with independent transceivers, a method for a channel access scheme may need to be defined.

Meanwhile, the prior arts of the present invention have been prepared to enhance understanding of the background of the present invention, and may include contents other than the prior arts already known to ordinary skilled persons in the field to which the present invention belongs.

DISCLOSURE

Technical Problem

An objective of the present invention for solving the above-described problem is directed to allowing a STA MLD and an AP MLD to negotiate a multi-link transmission scheme for performing a multi-link operation and to perform a channel access based thereon, so that an enhanced multi-link transmission operation can be performed.

Technical Solution

An exemplary embodiment of the present invention for achieving the objective, as an operation method of a first communication node in a communication system, may comprise negotiating a parameter for multi-link transmission with a second communication node; determining a plurality of links for performing the multi-link transmission and a transmission scheme for performing the multi-link transmission based on the parameter; and transmitting a data frame to the second communication node on the plurality of links in the transmission scheme.

The negotiating of the parameter for multi-link transmission may comprise transmitting to the second communication node a first frame including information for a multi-link operation of the first communication node; in response to the first frame, receiving from the second communication node a second frame including information for a multi-link operation of the second communication node; and determining the parameter for multi-link transmission based on the information for the multi-link operation of the second communication node.

The information for the multi-link operation of the first communication node may include first capability information of the first communication node, and the information for the multi-link operation of the second communication node may include second capability information of the second communication node.

Each of the first capability information and the second capability information may include information indicating whether the multi-link transmission operation is supported, information on a maximum number of links supported during the multi-link transmission, and band information for the multi-link transmission.

When the transmission scheme is a simultaneous transmission scheme, the plurality of links may include a primary link and a secondary link, and a channel state monitoring operation is performed on the primary link.

A channel occupancy state of the secondary link may be identified before transmitting the data frame through the primary link.

Another exemplary embodiment of the present invention for achieving the objective, as an operation method of a first communication node in a communication system, may comprise configuring a first link as a primary link for multi-link transmission to a second communication node; transmitting to the second communication node a first frame including an indicator indicating to change the primary link from the first link to a second link; and transmitting a data frame to the second communication node on the second link.

The first frame may be one of a probe response frame, an association response frame, a reassociation response frame, and a beacon frame.

The first frame may further include band information and channel information of the second link.

The first frame may further include information on a time at which the primary link is changed from the first link to the second link, and the data frame may be transmitted to the second communication node on the second link at the time at which the primary link is changed.

The operation method may further comprise performing a reassociation procedure with the second communication node on the second link.

The performing of the reassociation procedure with the second communication node on the second link may comprise transmitting a reassociation request message to the second communication node; receiving a reassociation response message, which is a response to the reassociation request message, from the second communication node; and performing reassociation with the second communication node on the second link based on the reassociation response message.

The first frame may further include information on a time at which the reassociation on the second link is performed, and the reassociation procedure may be performed at the time at which the reassociation is performed.

The first frame may further include information indicating whether the second link is activated.

Yet another exemplary embodiment of the present invention for achieving the objective, as a first communication node in a communication system, may comprise a processor; a memory electronically communicating with the processor; and instructions stored in the memory, wherein when executed by the processor, the instructions may cause the first communication node to: negotiate a parameter for multi-link transmission with a second communication node; determine a plurality of links for performing the multi-link transmission and a transmission scheme for performing the multi-link transmission based on the parameter; and transmit a data frame to the second communication node on the plurality of links in the transmission scheme.

In the negotiating of the parameter for multi-link transmission, the instructions may further cause the first communication node to: transmit to the second communication node a first frame including information for a multi-link operation of the first communication node; in response to the first frame, receive from the second communication node a second frame including information for a multi-link operation of the second communication node; and determine the parameter for multi-link transmission based on the information for the multi-link operation of the second communication node.

The information for the multi-link operation of the first communication node may include first capability information of the first communication node, and the information for the multi-link operation of the second communication node may include second capability information of the second communication node.

When the transmission scheme is a simultaneous transmission scheme, the plurality of links may include a primary link and a secondary link, and a channel state monitoring operation may be performed on the primary link.

A channel occupancy state of the secondary link may be identified before transmitting the data frame through the primary link.

Advantageous Effects

According to the present invention, in case that a STA MLD capable of multi-link operation performs communication with an AP MLD capable of multi-link operation, when attempting to transmit/receive a frame by using multiple links, the STA MLD and the AP MLD may exchange parameters for the multi-link transmission. In this case, a structure and components of the STA MLD may be considered. Here, depending on whether the AP MLD and the STA MLD are equipped with functions for the multi-link transmission, it may be determined whether or not a link configuration and validation process is to be performed. Accordingly, simultaneous transmission operation using multiple links can be efficiently performed.

The STA MLD and the AP MLD may perform negotiation to determine parameters for the multi-link transmission, and may determine the parameters for the multi-link transmission. In this case, per-link independent transmission, simultaneous transmission using a single primary link, or simultaneous transmission using multiple primary links may be performed in consideration of coexistence with the conventional communication nodes using the corresponding bands.

In addition, when the AP MLD supports multiple bands, if there are many STAs or STA MLDs are connected to a specific band (e.g., 2.4 GHz, 5 GHz, or 6 GHz band), the STA or STA MLD connected to the corresponding band may perform negotiation. A procedure in which the primary link of some communication nodes is changed may be performed through the negotiation process, and congestion for each band may be coordinated accordingly. That is, the multi-link access operation can be efficiently performed according to the structures of the STAs.

The present invention can be applied to a communication device using a WLAN (all communication devices including a terminal, a STA, a wireless AP, an access management device, a station and a base station using cellular communications, and the like).

DESCRIPTION OF DRAWINGS

FIG. 11 is a conceptual diagram illustrating an EHT operation element including available link information of an AP.

FIG. 23 is a conceptual diagram illustrating a structure of an information element separately including information on a primary link when a negotiation procedure for a multi-link operation is performed in a scheme of activating each link after an association process.

MODES OF THE INVENTION

Figure 1:
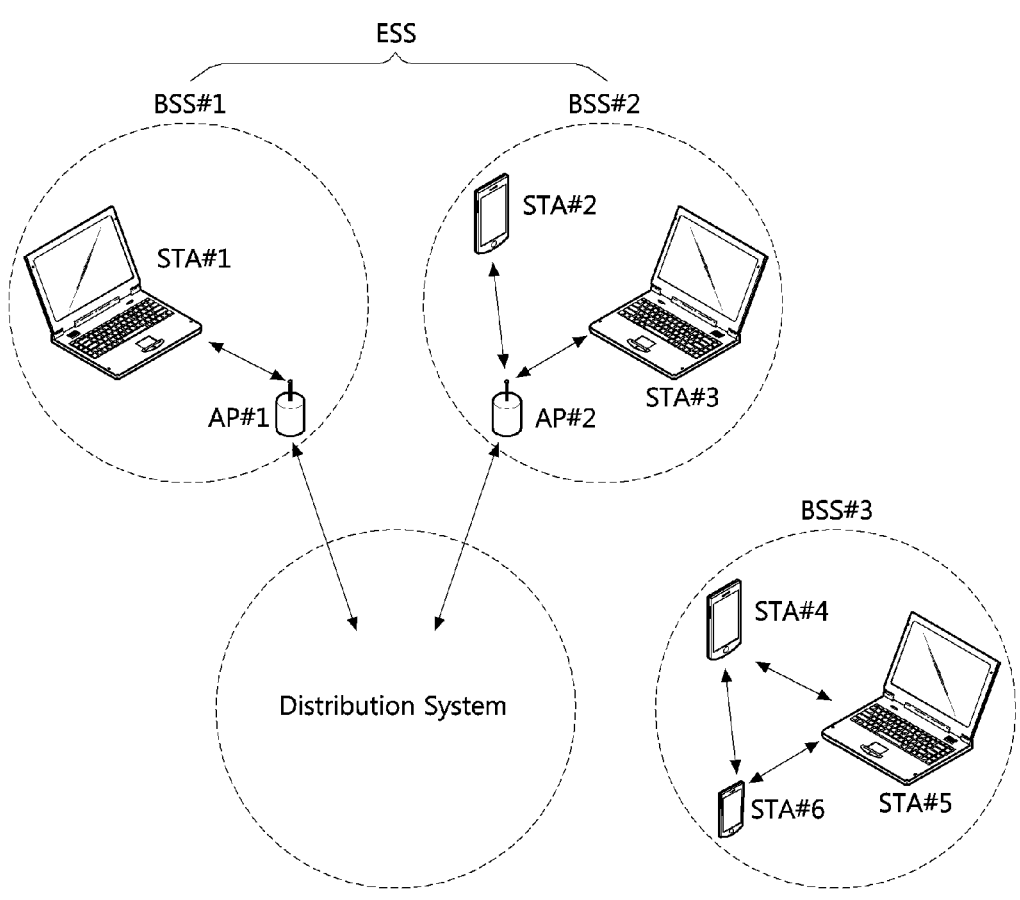
FIG. 1 is a conceptual diagram illustrating a first exemplary embodiment of a WLAN system.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, preferred exemplary embodiments of the present invention will be described in detail with reference to the accompanying drawings. In describing the present invention, to facilitate the entire understanding, like numbers refer to like elements throughout the description of the figures and the repetitive description thereof will be omitted.

In the following, a wireless communication network to which exemplary embodiments according to the present invention are applied will be described. The wireless communication network to which the exemplary embodiments according to the present invention are applied is not limited to the contents described below, and the exemplary embodiments according to the present invention may be applied to various wireless communication networks.

FIG. 1 is a conceptual diagram illustrating a first exemplary embodiment of a WLAN system.

As shown in FIG. 1, a WLAN system may include at least one basic service set (BSS). The BSS denotes a set of STAs (e.g., STA1, STA2 (i.e., AP1), STA3, STA4, and STA5 (i.e., AP2), STA6, STAT, and STAB) capable of communicating with each other through successful synchronization, and is not a concept that denotes a specific area. In exemplary embodiments below, a station that performs a function of an access point may be referred to as an 'access point (AP)', and a station that does not perform the function of an access point may be referred to as a 'non-AP station' or simply 'station'.

The BSSs may be classified as infrastructure BSSs and independent BSSs (IBSSs). Here, a BSS1 and a BSS2 may be infrastructure BSSs, and a BSS3 may be an IBSS. The BSS1 may include the station STA1, the access point STA2 (i.e., AP1) that provides a distribution service, and a distribution system (DS) that connects the plurality of access points STA2 (i.e., AP1) and STA5 (i.e., AP2). In the BSS1, the access point STA2 (i.e., AP1) may manage the STA1.

The BSS2 may include the STA3 and the STA4, the access point STA5 (i.e., AP2) that provides the distribution service, and the distribution system that connects the plurality of access points STA2 (i.e., AP1) and STA5 (i.e., AP2). In the BSS2, the access point STA5 (i.e., AP2) may manage the STA3 and the STA4.

The BSS3 may be an IBSS operating in an ad-hoc mode. In the BSS3, there is no AP which is an entity that performs a management function at a center. In other words, in the BSS3, the stations STA6, STA7, and STA8 may be managed in a distributed manner. In the BSS3, all the stations STA6, STA7, and STA8 may be mobile stations and may be not allowed to connect to the DS, thus constituting a self-contained network.

The access points STA2 (i.e., AP1) and STA5 (i.e., AP2) may provide access to the DS through a wireless medium for the stations STA1, STA3, and STA4 connected thereto. Communications between the stations STA1, STA3, and STA4 in the BSS1 or the BSS2 are generally performed through the access points STA2 (i.e., AP1) and STA5 (i.e., AP2), but when a direct link is established, direct communications between the stations STA1, STA3, and STA4 are also possible.

A plurality of infrastructure BSSs may be interconnected via a DS. A plurality of BSSs connected through a DS is referred to as an extended service set (ESS). The stations (e.g., STA1, STA2 (i.e., AP1), STA3, STA4, and STA5 (i.e., AP2)) included in an ESS may communicate with each other, and a station (e.g., STA1, STA3, or STA4) in the ESS may move from one BSS to another BSS while performing seamless communication.

The DS is a mechanism for an AP to communicate with another AP, in which the AP may transmit a frame for stations connected to a BSS managed by the AP or may transmit a frame for an arbitrary station having moved to another BSS. Also, the AP may exchange frames with an external network, such as a wired network. Such the DS is not necessarily a network, and has any form capable of providing a predetermined distribution service defined in an IEEE 802.11 standard. For example, a DS may be a wireless network, such as a mesh network, or a physical structure that connects APs with each other. Each of the communication nodes STA1, STA2 (i.e., AP1), STA3, STA4, STA5 (i.e., AP2), STA6, STAT, and STA8 included in the WLAN system may be configured as follows.

Figure 2:
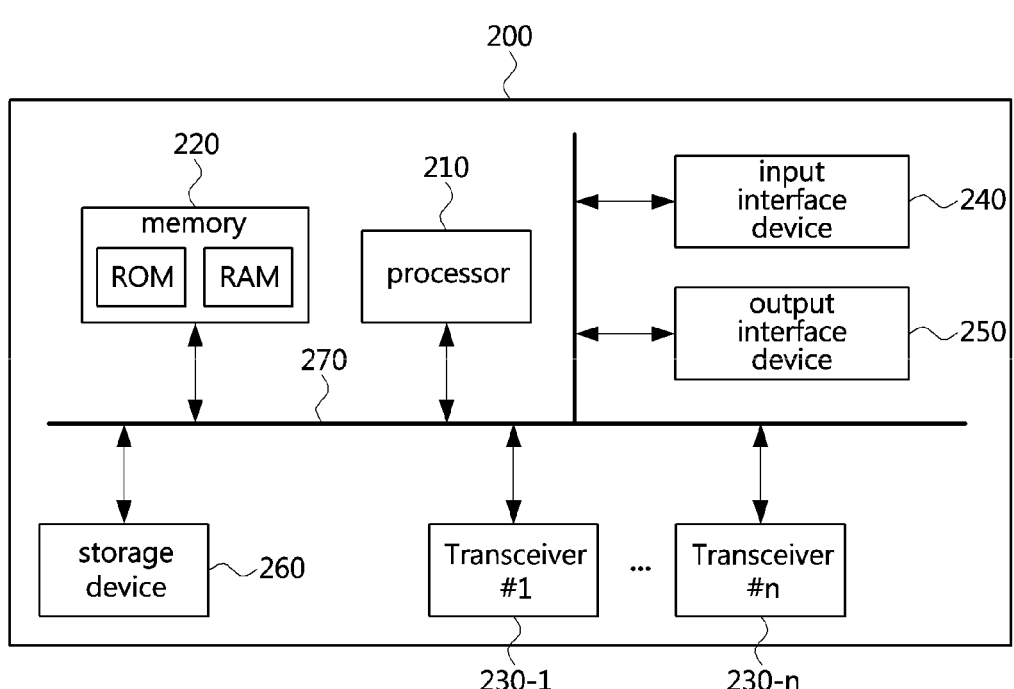
FIG. 2 is a block diagram illustrating a first exemplary embodiment of a communication node constituting a WLAN system.

FIG. 2 is a block diagram illustrating a first exemplary embodiment of a communication node constituting a WLAN system.

As shown in FIG. 2, a communication node 200 may comprise at least one processor 210, a memory 220, and a transceiver 230 connected to a network for performing communications. The transceiver 230 may also be referred to as a 'radio frequency (RF) unit', 'RF module', or the like. Also, the communication node 200 may further comprise an input interface device 240, an output interface device 250, a storage device 260, and the like. Each component included in the communication node 200 may communicate with each other as connected through a bus 270.

However, each of the components included in the communication node 200 may be connected to the processor 210 via a separate interface or a separate bus rather than the common bus 270. For example, the processor 210 may be connected to at least one of the memory 220, a plurality of transceivers (e.g., a transceiver #1 230-1, . . . , a transceiver #n 230-n), the input interface device 240, the output interface device 250, and the storage device 260 via a dedicated interface. Meanwhile, when the communication node 200 is an MLD, each of the plurality of transceivers of the communication node 200 may perform frame transmission and reception operations.

The processor 210 may execute at least one instruction stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may include at least one of a volatile storage medium and a non-volatile storage medium. For example, the memory 220 may comprise at least one of read-only memory (ROM) and random access memory (RAM). Meanwhile, in the WLAN system, an association procedure may be performed as follows.

Figure 3:
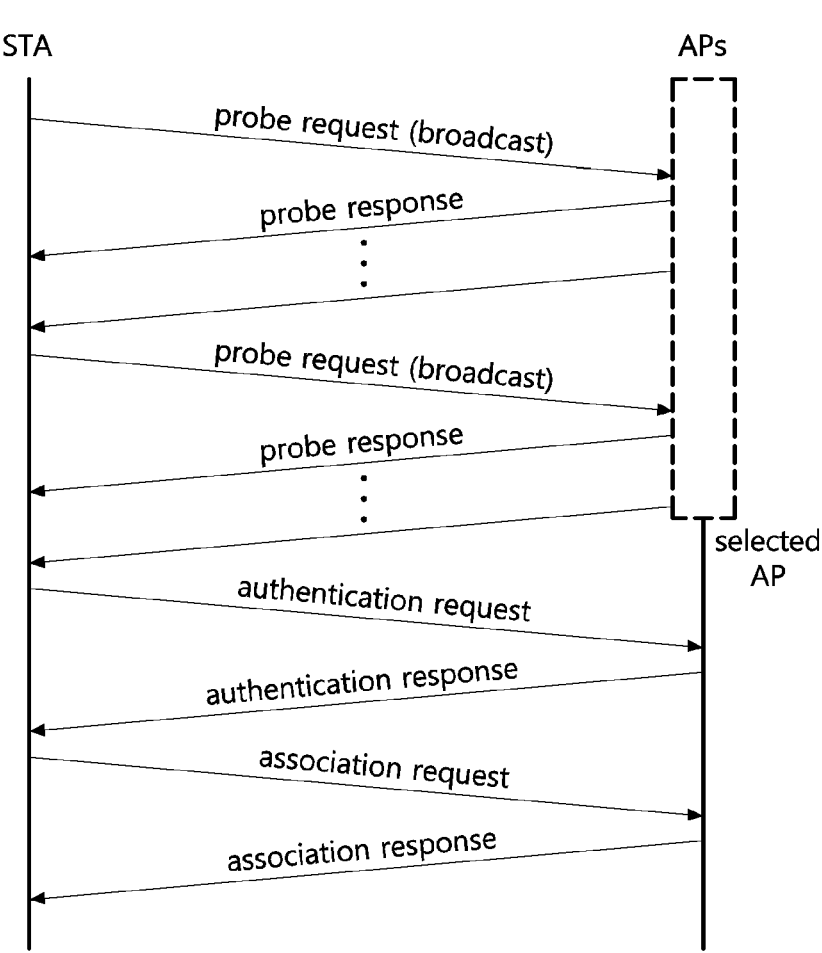
FIG. 3 is a sequence chart illustrating an association procedure of a station in a WLAN system.

FIG. 3 is a sequence chart illustrating an association procedure of a station in a WLAN system.

As shown in FIG. 3, an association procedure of a STA in an infrastructure BSS may be generally divided into a probe step of probing an AP, an authentication step for authentication with the probed AP, and an association step of associating with the authenticated AP.

The STA may first probe neighboring APs through a probe process. The probe process may be performed in a passive scanning scheme or an active scanning scheme. The passive scanning scheme may be performed by overhearing beacons transmitted by the neighboring APs. On the other hand, the active scanning scheme may be performed by broadcasting a probe request frame. The APs receiving the probe request frame may transmit probe response frames corresponding to the probe request frame to the STA. The STA may recognize the presence of the neighboring APs by receiving the probe response frames.

When the neighboring APs are detected, the STA may perform an authentication with a probed AP. In this case, the STA may perform an authentication with a plurality of probed APs. Authentication algorithms conforming to the IEEE 802.11 standard are classified into an open system algorithm for exchanging two authentication frames and a shared key algorithm for exchanging four authentication frames.

The STA may transmit an authentication request frame based on the authentication algorithms according to the IEEE 802.11 standards, and the STA may complete authentication with an AP by receiving an authentication response frame from the AP, which is a response to the authentication request frame.

When the authentication with the AP is completed, the STA may perform an association step with the AP. In this case, the STA may select one AP among the APs which have performed the authentication step with itself, and perform the association step with the selected AP. That is, the STA may transmit an association request frame to the selected AP and may receive an association response frame that is a response to the association request frame from the selected AP, so that the association with the selected AP can be completed.

Meanwhile, a communication node (e.g., an access point, a station, etc.) belonging to the WLAN system may perform transmission and reception of a frame based on a point coordination function (PCF), a hybrid coordination function (HCF), an HCF controlled channel access (HCCA), a distributed coordination function (DCF), and/or an enhanced distributed channel access (EDCA).

The frame in the WLAN system may be classified into a management frame, a control frame, and a data frame. The management frame may include an association request frame, an association response frame, a reassociation request frame, a reassociation response frame, a probe request frame, a probe response frame, a beacon frame, a disassociation frame, an authentication frame, a deauthentication frame, an action frame, and the like.

The control frame may be classified into an acknowledgment (ACK) frame, a block ACK request (BAR) frame, a block ACK (BA) frame, a power saving (PS)-Poll frame, a request-to-send (RTS) frame, a clear-to-send (CTS) frame, and the like. The data frame may be classified into a quality of service (QoS) data frame and a non-QoS data frames. The QoS data frame may indicate a data frame for which transmission according to QoS is required, and the non-QoS data frame may indicate a data frame for which transmission according to QoS is not required.

Meanwhile, in the WLAN system, a communication node (e.g., an access point or a station) may operate based on the EDCA.

Figure 4:
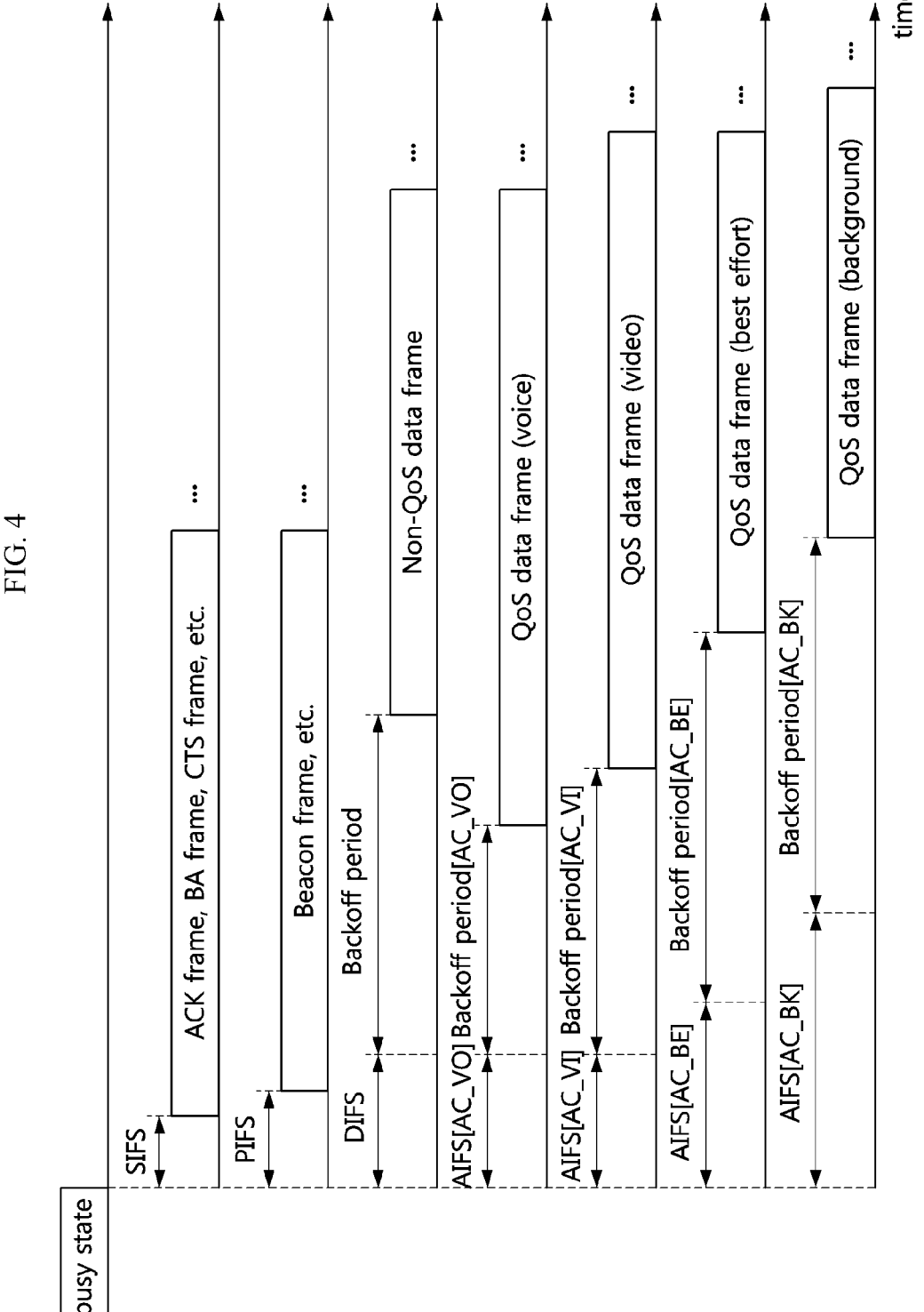
FIG. 4 is a timing diagram illustrating a first exemplary embodiment of an operation method of a communication node based on an EDCA.

FIG. 4 is a timing diagram illustrating a first exemplary embodiment of an operation method of a communication node based on an EDCA.

As shown in FIG. 4, a communication node that wants to transmit a control frame (or a management frame) may perform a monitoring operation (e.g., carrier sensing operation) on a channel state for a predetermined period (e.g., a short interframe space (SIFS) or a PCF IFS (PIFS)). When the channel state is determined to be an idle state for the predetermined period (e.g., SIFS or PIFS), the communication node may transmit a control frame (or a management frame). For example, the communication node may transmit an ACK frame, a BA frame, a CTS frame, or the like when the channel state is determined to be an idle state for the SIFS. Also, the communication node may transmit a beacon frame or the like when the channel state is determined to be an idle state for the PIFS. On the other hand, when the channel state is determined to be busy for the predetermined period (e.g., SIFS or PIFS), the communication node may not transmit a control frame (or a management frame). Here, the carrier sensing operation may be referred to as a 'clear channel assessment (CCA) operation'.

A communication node that wants to transmit a non-QoS data frame may perform a monitoring operation (e.g., carrier sensing operation) on a channel state for a DCF IFS (DIFS). When the channel state is determined to be idle for the DIFS, the communication node may perform a random backoff procedure. For example, the communication node may select a backoff value (e.g., backoff counter) within a contention window according to the random backoff procedure, and may perform the monitoring operation (e.g., carrier sensing operation) for a period corresponding to the selected backoff value. The communication node may transmit a non-QoS data frame when the channel state is determined to be an idle state for the backoff period.

A communication node that wants to transmit a QoS data frame may perform a monitoring operation (e.g., carrier sensing operation) on a channel state for an arbitration IFS (AIFS). When the channel state is determined to be idle for the AIFS, the communication node may perform a random backoff procedure. The AIFS may be set according to an access category (AC) of a data unit (e.g., a protocol data unit (PDU)) included in the QoS data frame. The AC of the data unit may be as shown in Table 1 below.

TABLE 1

| Priority | AC | Description |
|---|---|---|
| Lowest | AC_BK | Background |
| . | AC_BE | Best effort |
| . | AC_VI | Video |
| . | AC_VO | Voice |
| Highest | | |

AC_BK may indicate background data, AC_BE may indicate data transmitted in a best effort manner, AC_VI may indicate video data, and AC_VO may indicate voice data. For example, the length of the AIFS for the QoS data frame corresponding to each of AC_VO and AC_VI may be set equal to the length of the DIFS. The length of the AIFS for the QoS data frame corresponding to AC_BE and AC_BK may be set longer than the length of the DIFS. Here, the length of the AIFS for the QoS data frame corresponding to AC_BK may be set longer than the length of the AIFS for the QoS data frame corresponding to AC_BE.

In the random backoff procedure, the communication node may select a backoff value (e.g., backoff counter) within a contention window according to the AC of the QoS data frame. The contention window according to the AC may be as shown in Table 2 below. CWmin may indicate the minimum value of the contention window, CWmax may indicate the maximum value of the contention window, and each of the minimum and maximum values of the contention window may be expressed by the number of slots.

TABLE 2

| AC | $CW_{min}$ | $CW_{max}$ |
|---|---|---|
| AC_BK | 31 | 1023 |
| AC_BE | 31 | 1023 |
| AC_VI | 15 | 31 |
| AC_VO | 7 | 15 |

The communication node may perform a monitoring operation (e.g., carrier sensing operation) on the channel state for the backoff period, and transmit the QoS data frame when the channel state is determined to be in an idle state for the backoff period.

Hereinafter, WLAN multi-channel operation methods in a communication system will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a non-AP station is described, the corresponding AP may perform an operation corresponding to the operation of the non-AP station. Conversely, when an operation of the AP is described, the corresponding non-AP station may perform an operation corresponding to the operation of the AP.

In the following, a wireless communication network to which exemplary embodiments according to the present invention are applied will be described. The wireless communication network to which the exemplary embodiments according to the present invention are applied is not limited to the contents described below, and the exemplary embodiments according to the present invention may be applied to various wireless communication networks.

Figure 5:
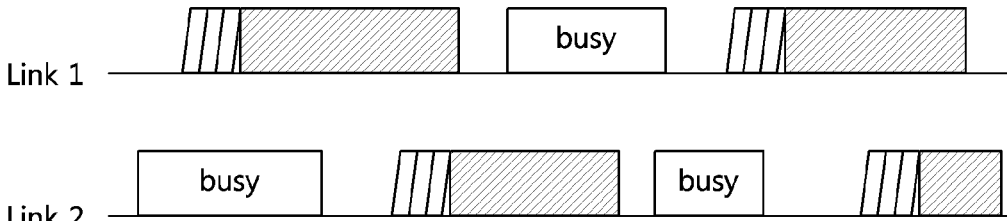
FIG. 5 is a conceptual diagram illustrating a first exemplary embodiment of a multi-link transmission method.

FIG. 5 is a conceptual diagram illustrating a first exemplary embodiment of a multi-link transmission method.

Referring to FIG. 5, a WLAN STA may transmit a frame using a non-contiguous bandwidth extension scheme (e.g., 80 MHz+80 MHz transmission). Further, the STA may transmit a frame using multiple links. The transmission method using multiple links may have a meaning of including a transmission method using multiple bands.

For example, the STA may transmit a frame through a channel extension method using a 40 MHz bandwidth in a 2.4 GHz band and a 160 MHz bandwidth in a 5 GHz band. Alternatively, the STA may transmit a frame in a manner of using a 160 MHz bandwidth in the 5 GHz band and a 160 MHz bandwidth in a 6 GHz band.

In this case, one frequency band may be defined as one link. On the other hand, when the multiple links are used to transmit and receive a frame, communication nodes performing the multi-link operations may be referred to as an access point (AP) multi-link device (MLD) or a STA MLD depending on their roles.

The multi-link transmission method may be implemented in a per-link independent transmission scheme or in a simultaneous transmission scheme. When the multi-link transmission method is implemented in the per-link independent transmission scheme, in a process in which a communication node receives a frame to be transmitted from a higher layer, a channel access operation for each link may be performed independently. That is, the communication node may acquire a transmission opportunity (TXOP) by performing a channel access operation, and transmit a frame when the TXOP is acquired. As described above, when the multi-link transmission method is performed in the per-link independent transmission scheme, frame transmission time points at the respective links may not coincide with each other. In this case, since channel access to each link is independently performed according to a channel occupancy state, each link can be used more efficiently.

Figure 6:
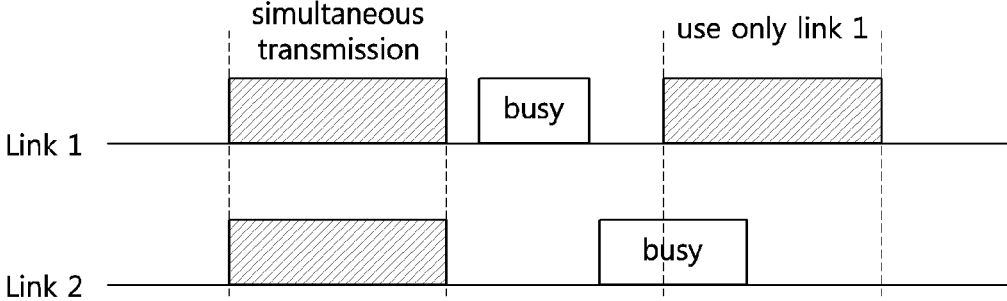
FIG. 6 is a conceptual diagram illustrating a second exemplary embodiment of a multi-link transmission method.

FIG. 6 is a conceptual diagram illustrating a second exemplary embodiment of a multi-link transmission method.

Referring to FIG. 6, when the multi-link transmission method is implemented in the simultaneous transmission scheme, the communication node may configure a transmission start time and a transmission end time of a frame transmitted through each link to be identical to those of other links. In the multi-link transmission according to the simultaneous transmission scheme, when the lengths of frames transmitted through the respective links are different, padding bits may be added to ensure that frame transmission times of the respective links are set to be the same.

Here, when a link state of one of two links is in a channel busy state, the communication node may transmit a frame using only one remaining link or perform a backoff operation according to a channel access scheme. When the communication node performs the multi-link operation using the simultaneous transmission scheme, a receiving STA MLD or AP MLD may simultaneously receive the frames transmitted through multiple links. Therefore, the operation of receiving the frame can be simplified.

Figure 7:
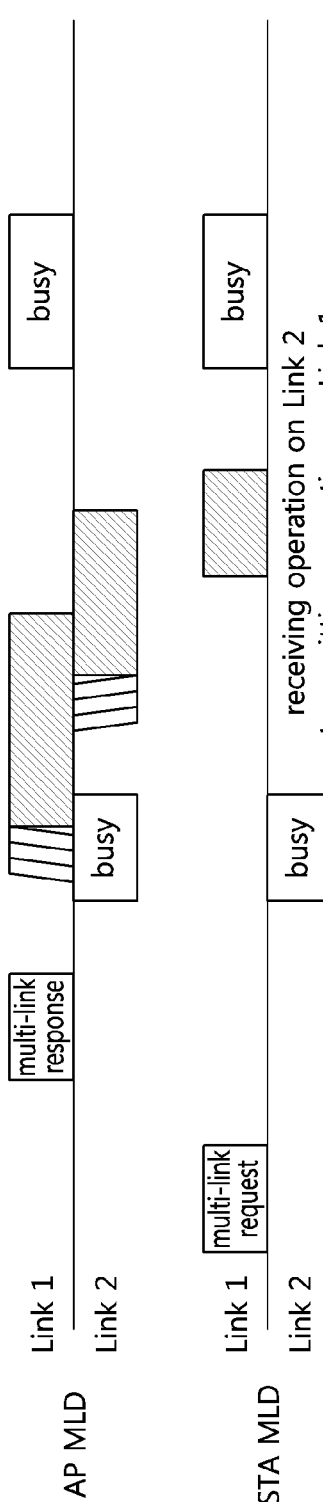
FIG. 7 is a conceptual diagram illustrating a multi-link operation performed by a communication node when a multi-link transmission method is implemented in a per-link independent transmission scheme.

FIG. 7 is a conceptual diagram illustrating a multi-link operation performed by a communication node when a multi-link transmission method is implemented in a per-link independent transmission scheme.

Referring to FIG. 7, in order to perform the per-link independent transmission scheme, a parameter negotiation procedure for multi-link operation between the AP MLD and the STA MLD may be performed before the multi-link operation is performed.

The negotiation procedure for performing the multi-link operation may include a step, in which the STA MLD transmits a request frame for multi-link operation to the AP MLD and receives an ACK for the request frame from the AP MLD, and a step, in which the AP MLD transmits a response frame for multi-link operation to the STA MLD and receives an ACK for the corresponding response frame from the STA MLD.

Alternatively, the negotiation procedure may be performed with a step in which the AP MLD transmits a request frame to the STA MLD and a step in which the STA MLD transmits a response frame to the AP MLD.

Parameters for the multi-link operation may include supported band, the number of supported multiple links, a desired band, a multi-link execution scheme (e.g., the per-link independent transmission scheme or the simultaneous transmission scheme), band information, and/or the like.

After the negotiation procedure for the multi-link operation, the multi-link operation may be performed on a link negotiated between the AP MLD and the STA MLD. When it is agreed that the multi-link operation is performed based on the per-link independent transmission scheme, the AP MLD and the STA MLD may transmit and receive frames by using a plurality of links independently.

In this case, a channel contention step may be performed on each link, and thus, a time point for transmitting a frame on each link may be different. That is, an operation of transmitting a frame may be performed on a link 1, and an operation of receiving a frame may be performed on a link 2.

For example, the STA MLD may receive a data frame from the AP MLD on the link 2 while transmitting a response frame (e.g., an ACK frame for a data frame, a data frame that is a response to a trigger frame, etc.) for a received frame on the link 1.

Alternatively, the STA MLD and the AP MLD may receive a data frame on one link while transmitting a data frame on another like. In this case, since the AP MLD and the STA MLD perform the transmitting operation on the link 1 and the receiving operation on the link 2 at the same time, the AP MLD and the STA MLD may need to have a plurality of wireless LAN transceivers. The AP MLD and the STA MLD may confirm that such the function can be performed through the negotiation procedure.

On the other hand, when the multi-link transmission method is implemented in the simultaneous transmission scheme, there may be a restriction that frames should be simultaneously transmitted on two links. Therefore, the channel access scheme may be complicated. As the channel access scheme, there may be a scheme in which a communication node performs channel access on a single primary link and then performs energy detection (ED) on another link just before a channel contention is completed and a TXOP is acquired on the primary link, and a scheme in which a communication node performs a channel access operation with the same backoff value for a plurality of links.

In the scheme using the single primary link among the above two schemes, the primary link may be a link on which channel sensing is performed for the channel access operation. Additionally, the primary link may be a link through which the STA MLD receives a management frame (e.g., beacon frame, etc.) from the AP MLD.

Figure 8:
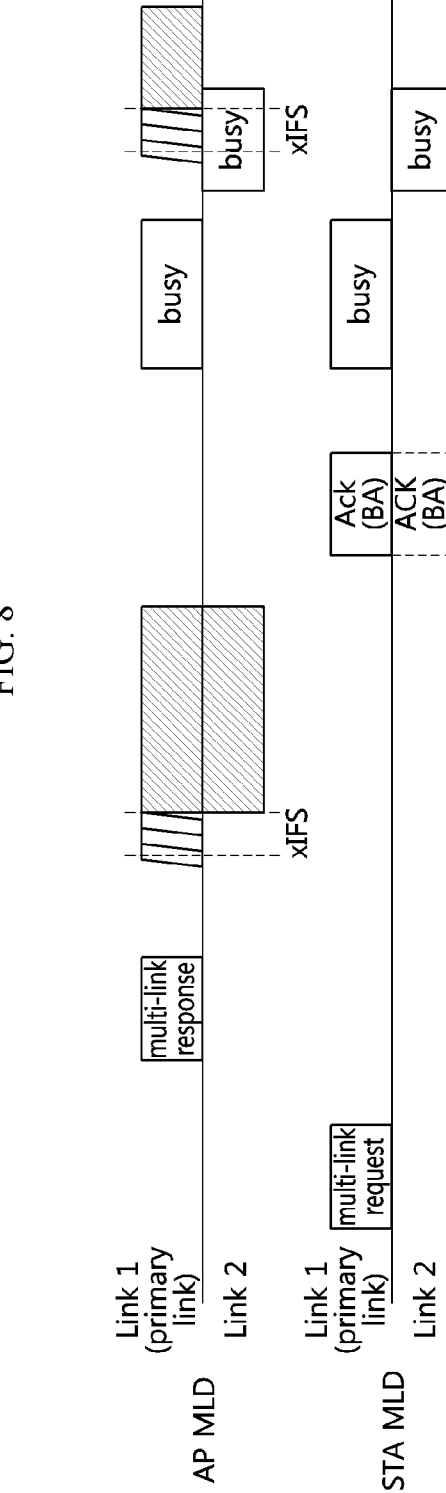
FIG. 8 is a conceptual diagram illustrating a method in which a communication node performs a multi-link simultaneous transmission operation using a single primary link.

FIG. 8 is a conceptual diagram illustrating a method in which a communication node performs a multi-link simultaneous transmission operation using a single primary link.

Referring to FIG. 8, even when the multi-link transmission method using a single primary link is performed, a negotiation procedure of parameters for multi-link operation may be performed between the AP MLD and the STA MLD as described above.

The negotiation procedure for performing the multi-link operation may include a step in which the STA MLD transmits a request frame for multi-link operation to the AP MLD, and receives an ACK for the corresponding request frame from the AP MLD, and a step in which the AP MLD transmits a response frame for multi-link operation, and receives an ACK for the response frame from the STA MLD.

On the other hand, in the single primary link based multi-link transmission method, if a procedure for configuring the primary link and a procedure for changing the primary link are not performed additionally, the STA MLD may perform communication using only one link when performing an access procedure with the AP MLD. Thereafter, another secondary link may be configured through the negotiation procedure for multi-link operation.

As described above, the parameters for the multi-link operation may include supported bands, the number of supported multiple links, a desired band, the number of multiple links to use, a multi-link execution scheme (e.g., per-link independent transmission scheme or simultaneous transmission scheme), band information, and/or the like.

After the negotiation procedure for the multi-link operation, the multi-link operation may be performed on the links negotiated between the AP MLD and the STA MLD. When the multi-link operation method is negotiated as the simultaneous transmission scheme, the AP MLD and the STA MLD may perform a channel access operation (e.g., conventional EDCA operation) on the primary link, and then perform channel sensing on a secondary link for a specific period (e.g., PIFS or AIFS) immediately before transmitting a frame. Thereafter, the AP MLD and the STA MLD may simultaneously transmit or receive frames using multiple links when a channel of the corresponding secondary link is empty.

In this case, after the channel sensing on the secondary link is performed, if the channel state of the corresponding link is determined to be busy as a result of the channel sensing, the AP MLD and the STA MLD may use only the primary link to transmit and receive the frame. Here, an ACK frame or a block ACK (BA) frame for the frame transmitted from the AP MLD to the STA MLD may be transmitted and received on the primary link. Alternatively, the corresponding ACK or BA frame may be duplicately transmitted also on all the links used to transmit the frame.

Meanwhile, when the multi-link operation using a single primary link is performed, the communication node may perform a channel access operation based on the corresponding primary link, and may receive a beacon frame, etc. on the corresponding primary link. Therefore, a procedure for configuring the primary link and a procedure for changing the primary link may be required. The procedure in which the communication node configures and changes the primary link may be performed in a manner in which the AP MLD announces related information.

Figure 9:
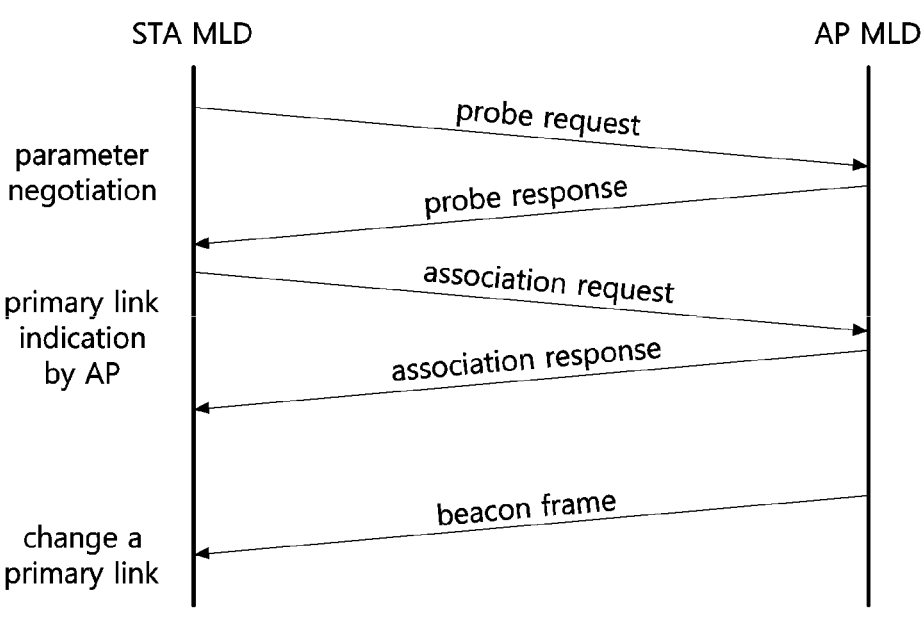
FIG. 9 is a conceptual diagram illustrating a method for an AP MLD to configure and change a primary link.

FIG. 9 is a conceptual diagram illustrating a method for an AP MLD to configure and change a primary link.

Referring to FIG. 9, the procedure of configuring and changing a primary link may be similar to a transmission procedure by extending a bandwidth in a wireless LAN (e.g., 40 MHz, 80 MHz, 160 MHz, or 80+80 MHz transmission), that is, a procedure in which the AP MLD configures a primary channel and announces it through a probe response frame, an association response frame, a reassociation response frame, a beacon frame, etc. Specifically, the procedure of configuring and changing the primary link may be performed in a manner in which the AP MLD configures the primary link and announces it.

In this case, a procedure in which the primary link is configured in the STA MLD may include a procedure in which an AP MLD initially performs scanning and an association procedure between the STA MLD and the AP MLD.

For example, through a procedure for exchanging the probe request and response frames and a procedure for exchanging the association request and response frames, capability elements (e.g., EHT capability elements) of the STA MLD and the AP MLD may be exchanged. Then, the STA MLD may receive information on the primary link from the AP MLD through the probe response frame and the association response frame.

Alternatively, the STA MLD may configure a band in which the STA MLD scans the AP MLD and performs an access procedure with the AP MLD as the primary link. After the primary link is configured, when the AP MLD wants to change the primary link of the STA MLD, the AP MLD may periodically notify that the currently-used primary link is to be changed to a new primary link through beacon frames.

Meanwhile, the EHT capability element may include capability (supported function) information including information indicating whether the STA MLD and the AP MLD have a plurality of wireless LAN transceivers.

In the procedure in which the STA MLD scans the AP MLD, the capability information of the AP MLD may be acquired. Also, in the association procedure, the capability information of the STA MLD and the capability information of the AP MLD may be exchanged. The STA MLD and the AP MLD may perform negotiation.

Meanwhile, a capability element for each function may be defined as each information element. Capability information to be used in the IEEE 802.11be may be defined as an EHT capability element, and the communication node may transmit the capability information through the probe request/response frames, the association request/response frames, and the beacon frame. Accordingly, the EHT capability element may be defined as shown in FIG. 10.

Figure 10:
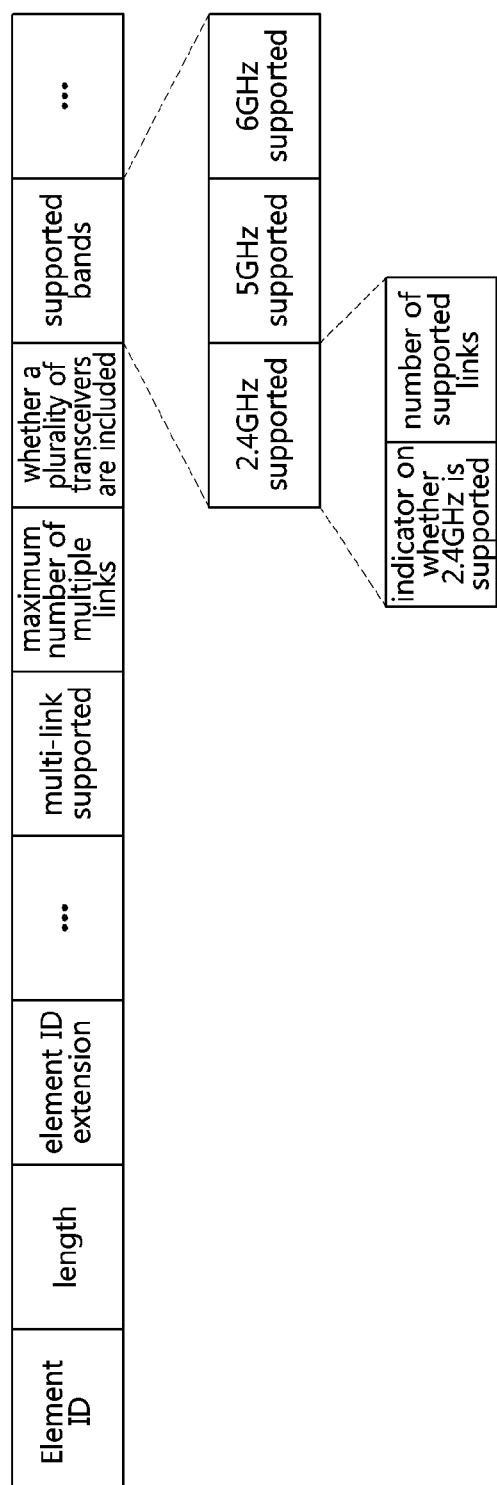
FIG. 10 is a conceptual diagram illustrating an EHT capability element including a capability field related to link operations.

FIG. 10 is a conceptual diagram illustrating an EHT capability element including a capability field related to link operations.

Referring to FIG. 10, the EHT capability element may include an element ID field, a length field, an element ID extension field, and capability information indicating supported operations among EHT operations. Here, the capability information indicating the supported operations among the EHT operations may include whether to support optional functions among functions defined in the IEEE 802.11be.

In particular, the capability information indicating the supported operation among the EHT operations may include capability information for the multi-link operation. For example, the capability information for the multi-link operation may include at least one of a field indicating whether the multi-link operation is supported, a field indicating the maximum number of supported links, a field indicating whether a plurality of transceivers are included, a field indicating supported bands, and a field indicating a link switching delay of the STA.

The field indicating whether a plurality of transceivers is included may be a field indicating the number of transceivers when the maximum number of supported links is 2 or more. The supported bands may be at least one of 2.4 GHz, 5 GHz and 6 GHz band, and may be indicated by 3 bits. The communication node may indicate the supported band by setting a bit corresponding to the supported band to '1'. The link switching delay may refer to the maximum time required for the STA to switch the link when the STA is instructed by the AP to change the link in use. On the other hand, the capability information may be additionally configured such that the number of supported links is set for each supported band.

Meanwhile, since operation elements for each revision are defined as information elements according to the revised version of the WLAN standard, the communication node may transmit information necessary for the operation defined in the IEEE 802.11be by including it in the EHT information element. In this case, the EHT information element may be announced to the STA periodically or at the request of the STA as included in the probe response frame, the association response frame, the reassociation response frame, and the beacon frame. Here, the EHT operation element including information of available links of the AP in the access procedure of the AP and the STA may be configured as shown in FIG. 11.

Figure 11:
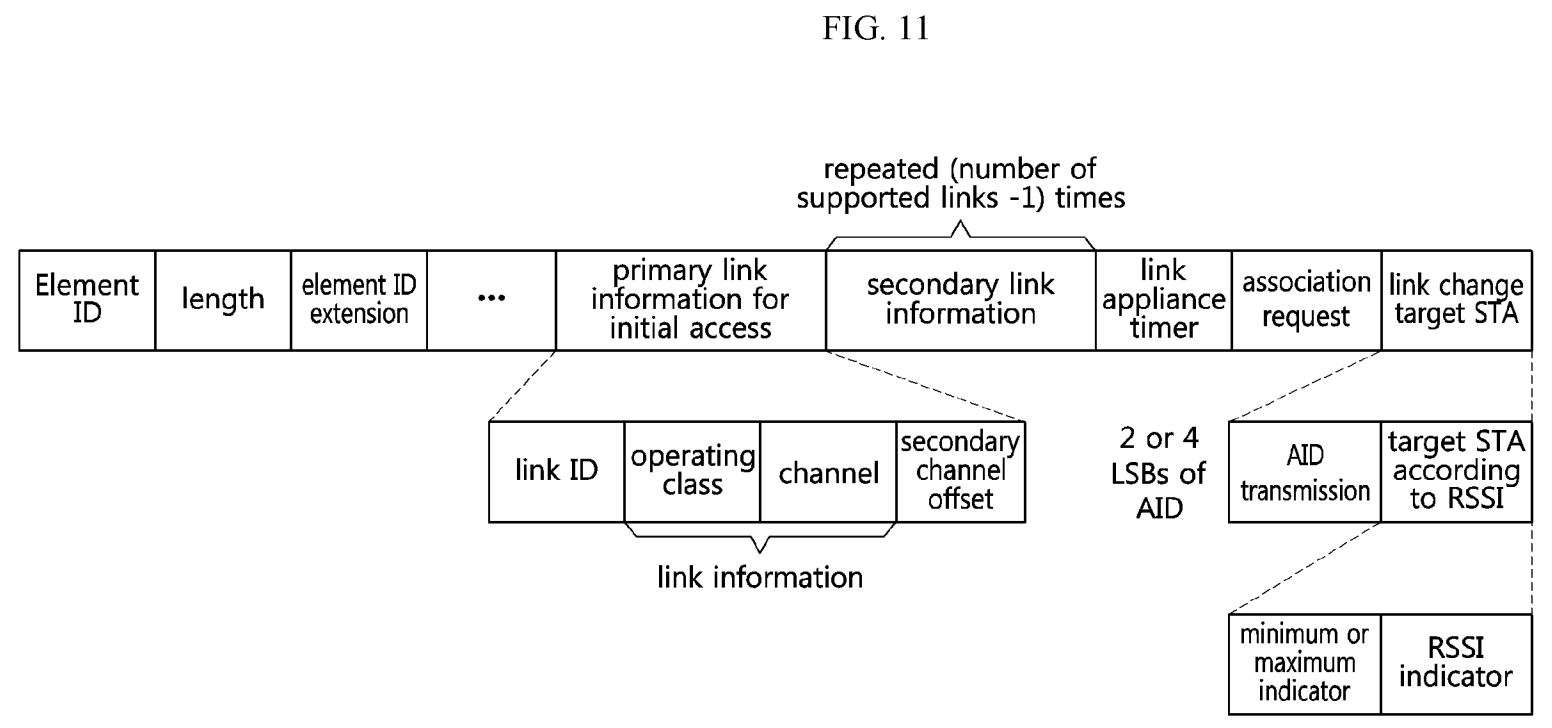

FIG. 11 is a conceptual diagram illustrating an EHT operation element including available link information of an AP.

Referring to FIG. 11, the EHT information element may include an element ID field, a length field, an element ID extension field, and EHT operation information. Here, the EHT operation information may include information for the multi-link operation, and the corresponding information may include an information field for a primary link, an information field for a plurality of secondary links, a field of an appliance time for the link, a reassociation request field, and a field indicating a STA whose primary link is to be changed.

In this case, the information for the secondary links included in the information for the multi-link operation may include information on the number of secondary links. Here, the number of secondary links may be (the number of supported links−1). The number of secondary links may be included in the EHT capability element. The information on each link may include a link ID allocated by the AP MLD for the link, channel information for the link, and information on an extension direction when performing a channel extension operation on the link.

On the other hand, the access operation may be configured to be performed on all the links without designating a separate primary link by the AP. In this case, the EHT operation field may not include information on the primary link and may include secondary link information as many as the number of supported secondary links.

When the AP MLD wants to change the primary link, the primary link through which the probe response frame, association response frame, reassociation response frame, or beacon frame is currently transmitted may be different from the primary link indicated by the corresponding field. In addition, a field of an appliance time for the link may include information on a time point for changing the primary link to the link indicated in the corresponding primary link field.

Meanwhile, the AP MLD may separately operate an AP and a BSS for each link. Accordingly, association IDs (AIDs) may be individually provided for each link. For example, when an AID of a current STA and an AID of a STA using a link corresponding to a field value indicating a primary link overlap, the AP MLD may instruct the current station STA to perform a reconnection process after changing the primary link through a reassociation request field. Through the reconnection process, the parameters to be used in a new primary link including an AID may be updated to new parameters when they are different from those of the previous primary link. The reconnection process may be performed by being replaced with the association or reassociation process.

In addition, the AP MLD may instruct only some of STAs or STA MLDs connected to the corresponding link to change the primary link in order to adjust congestions for the respective bands. In this case, the STA subjected to the change may be indicated through the field indicating a STA whose primary link is to be changed.

Among the STAs or STA MLDs, a STA or a STA MLD having lower n bits (e.g., 2 to 4 bits) of the AID coinciding with the value indicated by an AID field of a link change target field may be designated as the communication node subjected to the link change. In addition, a STA or a STA MLD having a received signal strength indicator (RSSI) less than or greater than a value of a field to which a predetermined RSSI value is set may be designated as the communication node subjected to the link change.

The reference value of the RSSI may be set differently according to a band in which the primary link to be moved operates. When the communication node moves to a frequency band lower than the currently operating band (e.g., when the communication node operates in the 6 GHz band and then moves to the 2.4 GHz band), a signal may be delivered smoothly to a wider area according to the frequency characteristics. Accordingly, the AP MLD may move STAs or STA MLDs having a poor reception signal state in the current 6 GHz band by designating them. That is, the AP MLD may instruct STAs having a poor reception signal state to move to the lower frequency band.

Since a supported coverage becomes narrower according to the frequency characteristics when the communication node moves to a higher frequency band than the currently operating frequency band (e.g., when the communication node operates in the 2.4 GHz band and then moves to the 6 GHz band), the AP MLD may instruct the STAs or STA MLDs having an RSSI greater than the predetermined RSSI to move to the higher frequency band.

As described above, when the link change target STAs or STA MLDs are designated based on the RSSIs, a field for designating the targets based on the RSSI may include a field with a length of 1 bit indicating whether the change target STA or STA MLD is a STA or STA MLD having an RSSI greater than the predetermined RSSI and a field indicating the predetermined RSSI.

For example, when the field with the length of 1 bit is set to 1, the AP MLD may instruct the STA or STA MLD having an RSSI greater than the value of the RSSI field to move to a channel of a designated band, that is, a link. When the field with the length of 1 bit is set to 0, the AP MLD may instruct the STA or STA MLD having an RSSI less than a minimum RSSI to move to a channel of a designated band, that is a link.

Figure 12:
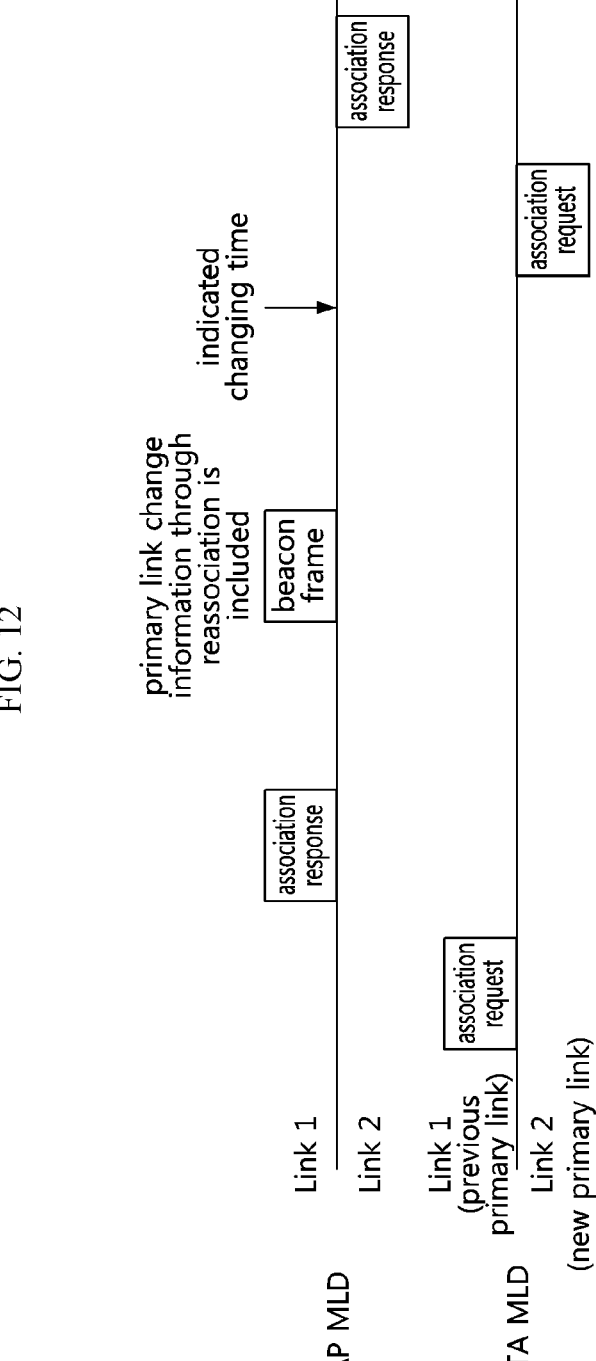
FIG. 12 is a conceptual diagram illustrating a procedure in which a reassociation operation between a STA MLD and an AP is performed when a primary link is changed through an EHT operation element.

FIG. 12 is a conceptual diagram illustrating a procedure in which a reassociation operation between a STA MLD and an AP is performed when a primary link is changed through an EHT operation element.

Referring to FIG. 12, after the association procedure between the STA MLD and the AP MLD is completed, if an indicator instructing to change a primary link is included in the EHT operation element of FIG. 11 included in the beacon frame, the STA or the STA MLD may change the primary link at the time indicated in the link appliance timer field of the EHT operation element.

In this case, if the reassociation request field of the EHT operation element is set to 1, the STA or the STA MLD may perform an association procedure or an access procedure with the AP MLD again after the time point indicated by the appliance timer of the link. Through the association procedure, parameters used in a new primary link including an AID may be updated to new parameters when they are different from those of the previous primary link.

In this case, the association procedure performed again may be performed on the changed primary link. After the (re)association procedure is performed again, the AP MLD may delete the AID used by the corresponding STA or STA MLD on the previous primary link. The AP MLD may allocate the deleted AID to another STA.

Meanwhile, the association procedure may be performed through an association request/response procedure, or may be performed through reassociation request/response messages. Alternatively, the access procedure may be performed in a manner in which the AP MLD transmits an unrequested association (or, reassociation) response frame at the indicated changing time, and transmits to the STA MLD only parameters (e.g., AID) to be used on the link after the change among the parameters used on the current link. The STA MLD may transmit an ACK to the AP MLD to inform whether the message has been correctly received.

Figure 13:
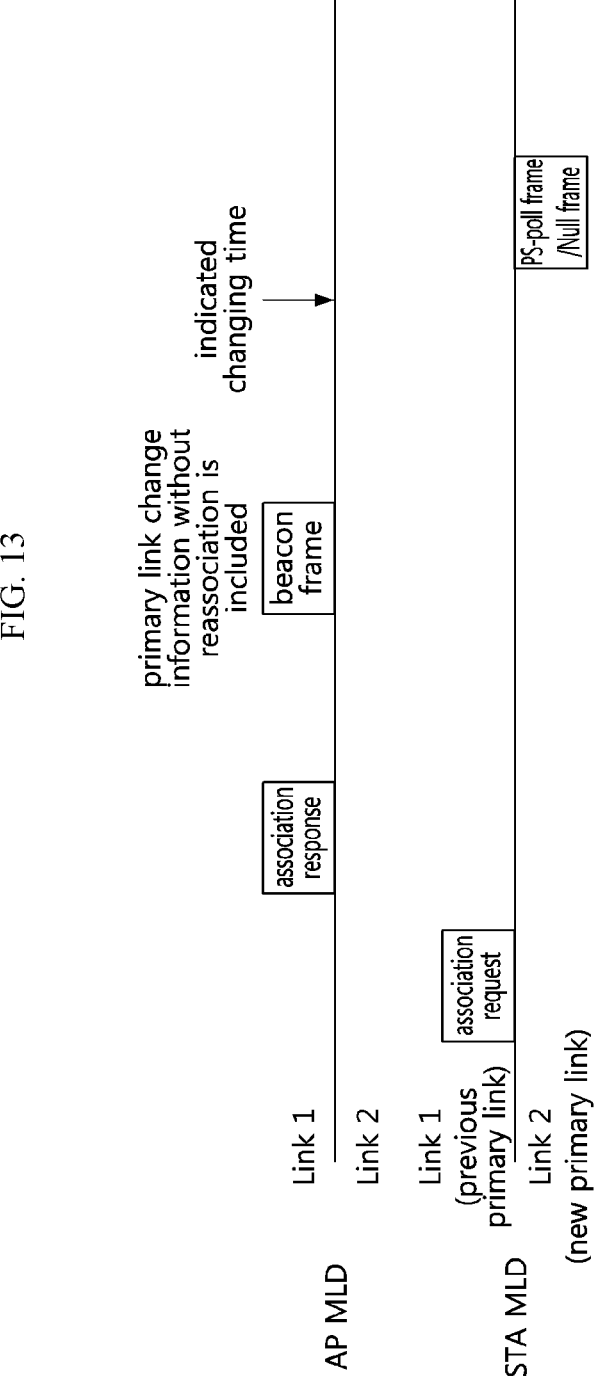
FIG. 13 is a conceptual diagram illustrating a first exemplary embodiment of an operation for notifying that a STA changes a primary link through simple frame transmission without reassociation between a STA MLD and an AP MLD when changing the primary link through an EHT operation element.

FIG. 13 is a conceptual diagram illustrating a first exemplary embodiment of an operation for notifying that a STA changes a primary link through simple frame transmission without reassociation between a STA MLD and an AP MLD when the primary link is changed through an EHT operation element.

Referring to FIG. 13, when a primary link is changed through the EHT operation element, the AP MLD may determine the reassociation procedure does not need to be performed. In this case, the STA or STA MLD may transmit an arbitrary frame notifying that the primary link has been changed on the changed primary link after the appliance time of the designated link.

In this case, the arbitrary frame may be a PS-Poll frame, an arbitrary data frame, or a null frame. The AP MLD may receive the arbitrary frame from the corresponding STA on the primary link changed after the appliance time of the link.

The AP MLD may register AID information of the corresponding STA in the changed primary link. On the other hand, the AP MLD may delete the AID information used in the previous primary link, and allocate the deleted AID to another STA using the previous primary link.

The deleted AID information may be the same as the AID information used in the previous link. When a different value is to be used, the AP MLD may transmit a frame including a new AID value mapped to a MAC address of the STA MLD after the indicated changing time. For example, the AP MLD may allocate a new AID to the STA MLD by transmit an unrequested AID response frame.

Figure 14:
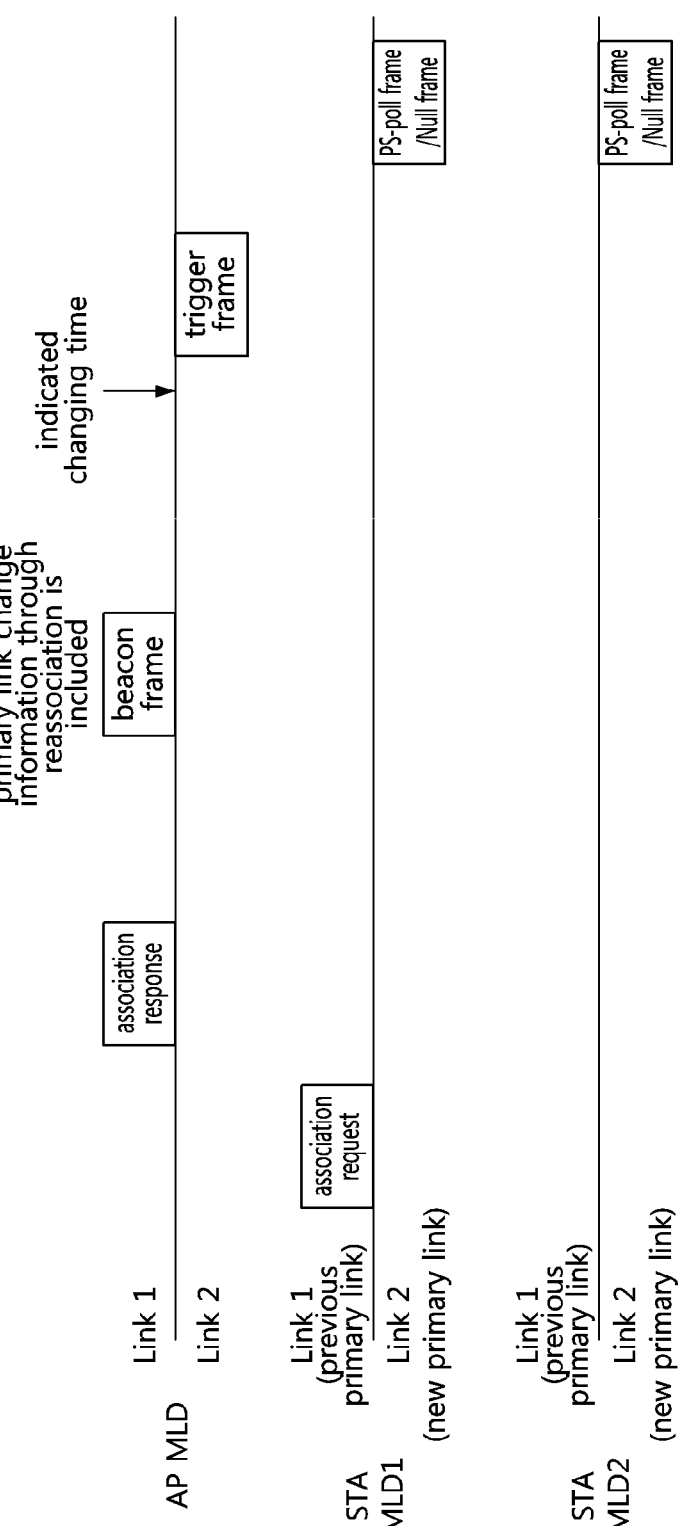
FIG. 14 is a conceptual diagram illustrating a second exemplary embodiment of an operation for notifying that a STA changes a primary link through simple frame transmission without reassociation between a STA MLD and an AP MLD when changing the primary link through an EHT operation element.

FIG. 14 is a conceptual diagram illustrating a second exemplary embodiment of an operation for notifying that a STA changes a primary link through simple frame transmission without reassociation between a STA MLD and an AP MLD when changing the primary link through an EHT operation element.

Referring to FIG. 14, the AP may request a plurality of STAs to change the primary link through the EHT operation element of FIG. 11. In this case, the AP may allow the plurality of STAs or STA MLDs to transmit an arbitrary frame without a reassociation procedure as shown in FIG. 13, thereby notifying that the AP MLD changes the primary link. To this end, the AP MLD may transmit a trigger frame to request one or more corresponding STAs to transmit the frame.

A communication node receiving the trigger frame may be the STAs or STA MLDs subjected to the primary link change, which are included in the EHT operation element. In this case, since the association procedure may not be required for the corresponding STAs or STA MLDs, the AP MLD may transmit the trigger frame by including the AID used in the previous primary link in an AID subfield of the trigger frame.

The STA or STA MLD may perform a primary link change at the appliance time of the link information indicated in the EHT operation element. Thereafter, the STA or STA MLD may receive the trigger frame including the AID of the corresponding STA or STA MLD in the changed primary link. The STA or STA MLD may transmit an arbitrary frame (e.g., PS-poll frame, data frame, null frame, etc.) as a response frame to the corresponding trigger frame. Accordingly, the corresponding STA or STA MLD may inform the AP MLD that the primary link has been changed.

The AP MLD receiving the arbitrary frame may register the AID information of the corresponding STA or STA MLD in the changed primary link. On the other hand, the AP MLD may delete the AID information used in the previous primary link, and allocate the deleted AID to another STA using the previous primary link.

Meanwhile, when a link used by a plurality of STAs or STA MLDs is changed to a new link, a situation where AIDs of some STAs or all STAs are already allocated to STAs of the new link, and the AIDs need to be changed may occur.

In order to change the AIDs of target STAs that need to change the AIDs, a trigger type of the trigger frame transmitted at the indicated changing time or later may be set to a link change parameter trigger. The AID field of the user info field may include the previously used AID, and only the STAs or STA MLDs, in which the link change has been performed, may transmit the response frame for the trigger frame.

In this case, the response frame may be an AID request frame requesting a new AID allocation. Alternatively, the AP MLD may transmit the trigger frame by including information on a resource to be used by the STA for the response and an AID to be used by the STA in the trigger frame. In addition, the AP MLD may transmit parameters to be updated and updated parameters on the current link for each STA through the trigger frame.

Since the type of the trigger frame for changing the AID is the link change parameter trigger, the STAs not instructed to change the link may not transmit response frames for the trigger frame. The STAs receiving the trigger frame may respond by transmitting an ACK message or a null packet through the resource indicated by the trigger frame. The STAs may inform via the response that the parameters have been successfully updated. The AID used in the response frame may be the updated AID. The STAs may transmit the response frame by inserting the updated AID into the response frame.

Figure 15:
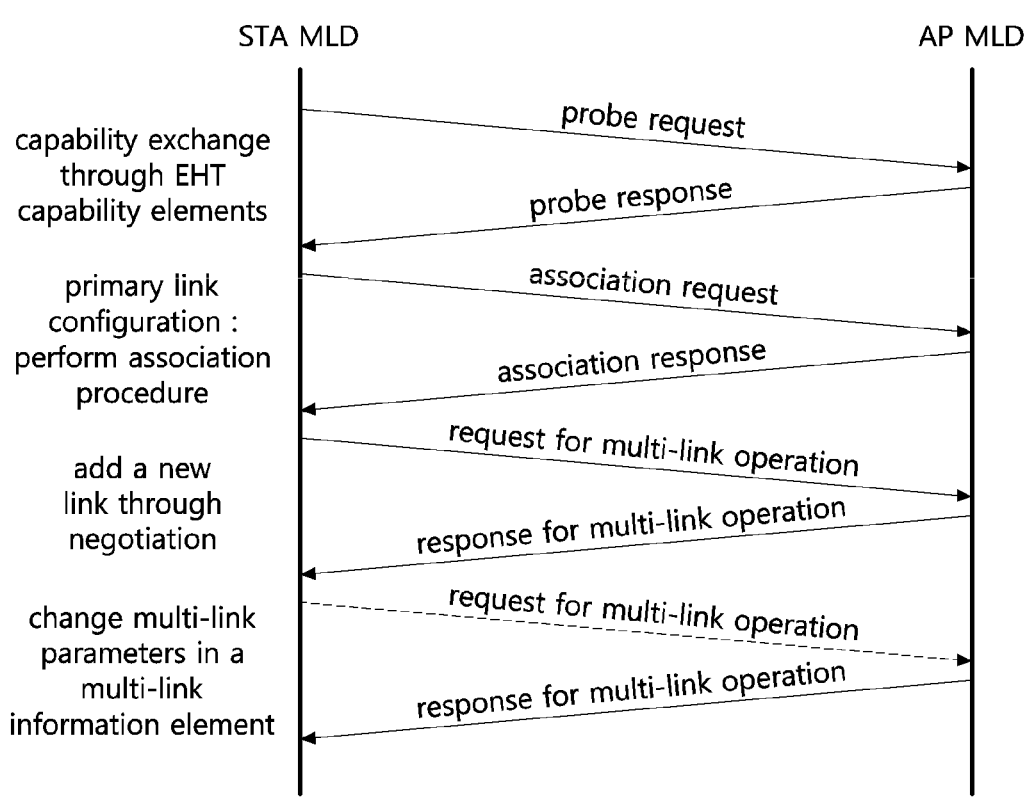
FIG. 15 is a sequence chart illustrating a first exemplary embodiment of a negotiation and change procedure for performing a multi-link operation between an AP MLD and a STA MLD.

FIG. 15 is a sequence chart illustrating a first exemplary embodiment of a negotiation and change procedure for performing a multi-link operation between an AP MLD and a STA MLD.

Referring to FIG. 15, when performing a multi-link operation using a single primary link, as shown in FIG. 9, the primary link may be configured in a manner in which the AP MLD announces the primary link. However, the primary link may also be configured through a negotiation procedure between the STA MLD and the AP MLD.

Even when the primary link is configured through the negotiation procedure, an AP MLD scanning and access procedure at the STA MLD may be performed through a procedure of exchanging probe request/response frames and association request/response frames, as shown in FIG. 9. Through such procedure, the capability elements (e.g., EHT capability elements including whether multi-link related functions are supported) of the STA MLD and the AP MLD may be exchanged. The STA MLD may receive an EHT operation element including multi-link related information from the AP MLD.

In this case, a link corresponding to a band in which the WLAN STA MLD performs the access procedure with the AP MLD may be configured as a single link, and the single link may be configured as the primary link.

Thereafter, the STA MLD may perform negotiation for the multi-link operation with the AP MLD. In this case, the parameters for the corresponding multi-link operation may be exchanged. The information on the primary link may be exchanged as included in the parameters.

That is, when the STA MLD and the AP MLD want to maintain the primary link, a frame may be configured by including the single link used by the STA MLD after the STA MLD is accessed to the AP MLD as the primary link information. Information on a link to be added may be further included in the corresponding frame. Thereafter, a procedure of exchanging a request frame and a response frame for multi-link operation may be performed.

Alternatively, when the STA MLD wants to configure a new primary link, a request frame for multi-link operation including information on a primary link to be configured may be transmitted. In addition, the STA MLD may transmit a response frame for multi-link operation indicating approval or rejection on the primary link requested by the AP MLD, and may perform a negotiation procedure for configuring the primary link. In this case, the negotiation procedure for using the multi-link may be performed when the STA MLD performs the access procedure with the AP MLD.

After the STA MLD and the AP MLD perform the negotiation procedure for multi-link operation, if the STA MLD wants to change the primary link, the STA MLD may transmit a request frame for multi-link operation including information on a new primary link. Thereafter, the STA MLD may perform a procedure for changing the primary link by transmitting a response frame for multi-link operation indicating approval or rejection on the primary link requested by the AP MLD.

Alternatively, if the AP MLD wants to change the primary link of the STA MLD, the AP MLD may transmit an unrequested response frame for multi-link operation including information on a new primary link. Through this, the AP MLD may announce that the primary link used by the STA MLD has been changed.

As described above, the negotiation procedure for performing the multi-link operation may include the procedure in which the request frame for multi-link operation and the response frame for multi-link operation are exchanged between the STA and the AP. In this case, an information element for multi-link operation included in the request frame and the response frame may be configured as shown in FIG. 16.

Figure 16:
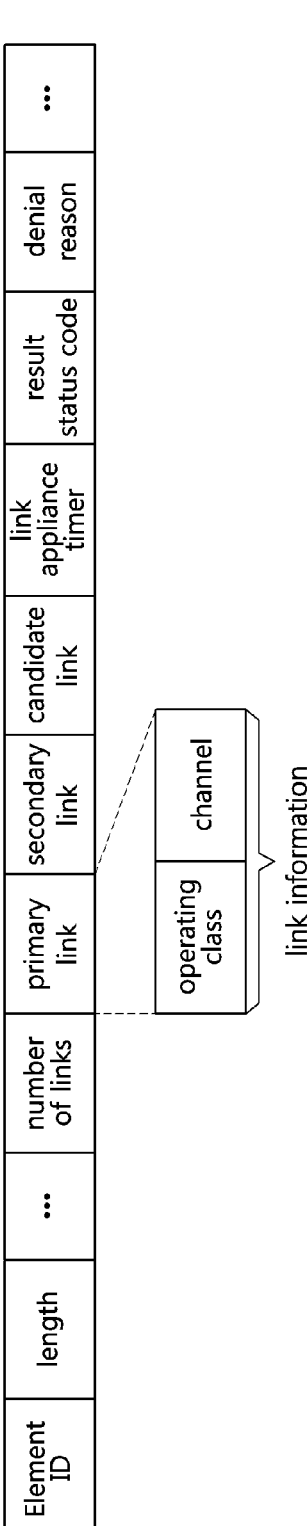
FIG. 16 is a conceptual diagram illustrating a first exemplary embodiment of a multi-link information element used in a negotiation procedure for performing a multi-link operation between a STA MLD and an AP MLD when performing the multi-link operation.

FIG. 16 is a conceptual diagram illustrating a first exemplary embodiment of a multi-link information element used in a negotiation procedure for performing a multi-link operation between a STA MLD and an AP MLD when performing the multi-link operation.

Referring to FIG. 16, the information element for multi-link operation may include an element ID field, a length field, an element ID extension field, a field indicating the number of links to be used, a primary link field, a secondary link field, a candidate link field, a link appliance timer field, a request result (i.e., result status code) field included in the response frame, a field indicating a request rejection reason (i.e., denial reason), and the like.

When the STA MLD requests a change of a primary link, the STA MLD may transmit the primary link field, the secondary link field, and the candidate link field by including information on bands and channels corresponding to a primary link, a secondary link, and a candidate link to be used.

The link appliance timer field may include information on a time at which the changed link is to be applied. In this case, the AP MLD may receive the request frame for multi-link operation including the corresponding information from the STA MLD. The AP MLD may transmit information indicating whether to approve or reject the request by including the information in the request result field of the response frame for multi-link operation according to the request frame.

When the request is rejected, the reason (e.g., when the corresponding primary link is congested, when the AP MLD currently has data to transmit to the STA MLD, or the like) for rejecting the request may be indicated in the denial reason field.

When the request is approved, the response frame for the multi-link operation, which is transmitted by the AP MLD, may include information on the primary link, the secondary link, and the candidate link, which are included in the request frame, and the link appliance timer may indicate a time at which the changed link information is to be applied.

In this case, if there is a frame to be transmitted from the AP MLD to the STA MLD, the time indicated in the link appliance timer field in the response frame may be a time later than the time indicated by the link appliance timer in the request frame. When the AP MLD wants to change the parameters for the multi-link operation of the STA through transmission of the unrequested response frame, the changed link information, the time at which the link information is to be applied, and the like may be transmitted as included in the corresponding fields.

Figure 17:
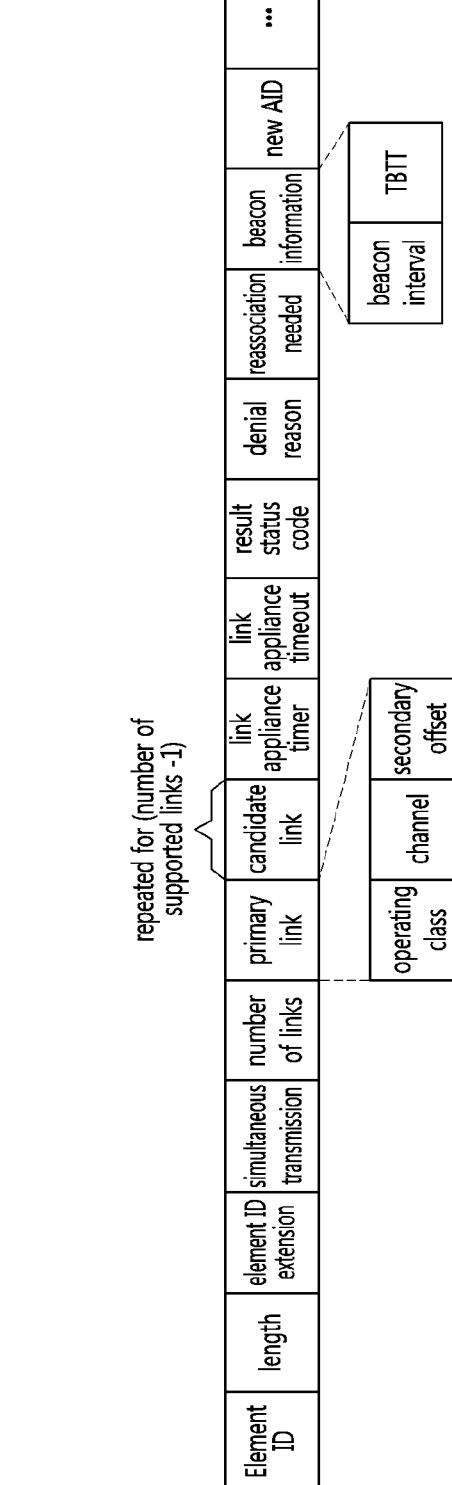
FIG. 17 is a conceptual diagram illustrating a second exemplary embodiment of a multi-link information element used in a negotiation procedure for performing a multi-link operation between a STA MLD and an AP MLD when performing the multi-link operation.

FIG. 17 is a conceptual diagram illustrating a second exemplary embodiment of a multi-link information element used in a negotiation procedure for performing a multi-link operation between a STA MLD and an AP MLD when performing the multi-link operation.

Referring to FIG. 17, the information element for multi-link operation may include an element ID field, a length field, an element ID extension field, a field indicating whether or not to perform simultaneous transmission, a field indicating the number of links to be used, a primary link field, a plurality of secondary link fields, a link appliance timer field, a link appliance timeout field, a result status code field included in the response, a denial reason field, a beacon transmission time information field (i.e., beacon information field) transmitted on a changed link when the primary link is changed, and the like. The beacon transmission time information may indicate a target beacon transmission time (TBTT) interval.

The field indicating whether to perform simultaneous transmission may be a field indicating whether the per-link independent transmission scheme or the simultaneous transmission scheme is performed when the transmission operation using multiple links is performed. In this case, if the EHT capability element indicates that two or more transceivers are not included when the STA MLD performs the access procedure, or if the number of transceivers included in the STA MLD is smaller than the number of links to be configured, the multi-link operation may be performed in the simultaneous transmission scheme.

On the other hand, when the STA MLD requests to change the primary link, the primary link field and the secondary link field may be transmitted as including information on preferred bands and preferred channels for the primary link and the secondary link, and a channel extension direction in the corresponding link.

In addition, the link appliance timer field may include information on a time at which the changed link is to be applied. In this case, the AP MLD may receive the request frame for multi-link operation including the corresponding information from the STA MLD. The AP MLD may transmit the response frame for multi-link operation according to the request frame including information indicating whether to approve or reject the request in the result status code field.

When the request is rejected, a reason for rejecting the request (e.g., when the primary link is congested, when the AP MLD currently has data to transmit to the STA MLD, or the like) may be indicated in the denial reason field.

When the request is approved, the AP MLD may include information on the primary link and secondary link, which is included in the request frame, in the response frame for multi-link operation, and the time at which the changed link information is to be applied may be included in the link appliance timer field.

The time at which the changed link information is to be applied may indicate a time later than a time after a lapse of the link switching delay of the STA MLD, which has been exchanged in the association procedure between the STA MLD and the AP MLD, from the time at which the corresponding response frame is transmitted.

In this case, if there is a frame to be transmitted from the AP MLD to the STA MLD, the time indicated in the link appliance timer field of the response frame may be a time later than the time indicated by the link appliance timer field of the request frame. When the negotiation procedure for multi-link operation is performed so that the primary link of the STA MLD is changed, the AP MLD may indicate whether the STA MLD should perform the association procedure again in the changed primary link. Additionally, the AP MLD may further indicate transmission time information of beacons transmitted on the changed primary link.

Alternatively, when the STA MLD changes the primary link, the AP MLD may indicate information on an AID to be used in the changed primary link instead of instructing the reassociation procedure of the STA MLD.

Meanwhile, when the AP MLD does not separately operate a BSS for each link and operates a BSS for several links, the reassociation procedure and allocation of a new AID according to the change of the primary link of the STA MLD may not be required. In this case, the corresponding field may be omitted. When the AP MLD wants to change the parameters for the multi-link operation by transmitting an unrequested response frame for the STA MLD, the changed link information and the time at which the corresponding link information is to be applied may be transmitted as being included in the corresponding field.

Meanwhile, since the procedure of changing the primary link does not occur from time to time, it may be indicated in a manner in which only link information is included without distinction for the primary link in the negotiation procedure for multi-link operation. In this case, when negotiation for the multi-link operation including the operation of changing the primary link is performed, information for changing the primary link may be indicated through a separate information element. In this case, only a plurality of link information may be included in the information element used in the multi-link negotiation procedure without discrimination of links.

Figure 18:
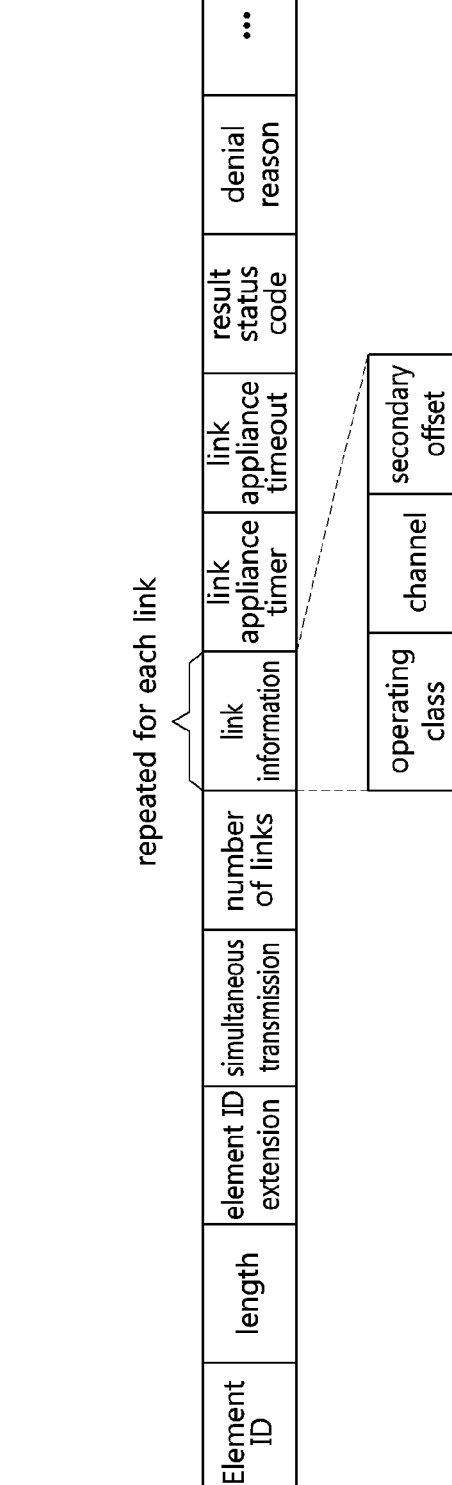
FIG. 18 is a conceptual diagram illustrating a third exemplary embodiment of a multi-link information element used in a negotiation procedure for performing a multi-link operation between a STA MLD and an AP MLD when performing the multi-link operation.

FIG. 18 is a conceptual diagram illustrating a third exemplary embodiment of a multi-link information element used in a negotiation procedure for performing a multi-link operation between a STA MLD and an AP MLD when performing the multi-link operation.

Referring to FIG. 18, when the primary link information is not included in the information element for negotiation for multi-link operation, only the number of links to be used and information on each link may be included. Meanwhile, the beacon time information, the information on whether a reassociation procedure is needed, and the information on the new AID in the multi-link information element of FIG. 17, which are used when changing the primary link, may not be included in the information element of FIG. 18.

When the primary link information is not included in the information element for negotiation for multi-link operation, if the communication node wants to change the primary link, the communication node may further include an information element for changing the primary link in a negotiation frame for multi-link operation. The information element may be configured as shown in FIG. 19.

Figure 19:
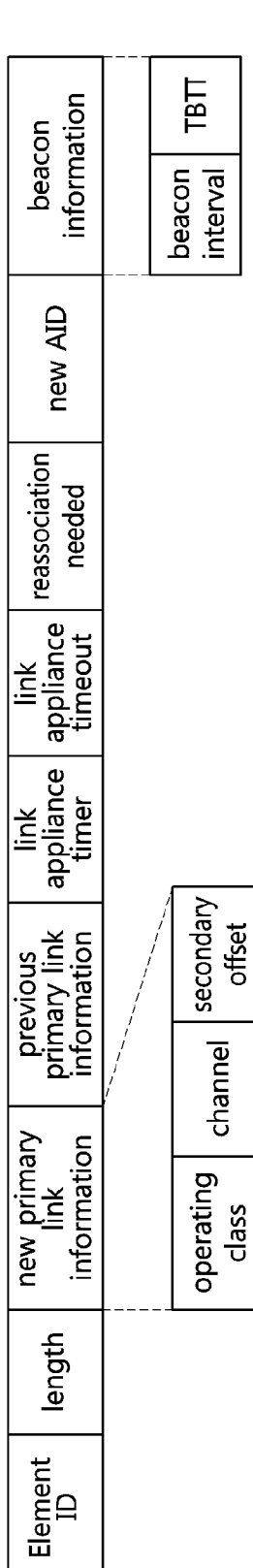
FIG. 19 is a conceptual diagram illustrating an information element for changing a primary link when information for changing the primary link is transmitted through a separate information element.

FIG. 19 is a conceptual diagram illustrating an information element for changing a primary link when information for changing the primary link is transmitted through a separate information element.

Referring to FIG. 19, the information element for changing the primary link, which is separately included when performing the multi-link operation, may include at least one of an element ID field, a length field, an element ID extension field, a new primary link information field, a previous primary link information field, a link appliance timer field, a link appliance timeout field, a field indicating whether a reassociation operation is needed, a field indicating an AID to be used in a new primary link, and a beacon transmission time information field of beacons transmitted on a changed primary link.

The primary link information field may include a field indicating channel information of the corresponding link and a field indicating a bandwidth extension direction in the corresponding link, similarly to the primary link information field and the secondary link information field shown in FIG. 17. The multi-link configuration operation of the STA MLD, to which the above-described link appliance timer field and link appliance timeout field are applied, may be identical or similar to those of FIGS. 12, 13, and 14.

On the other hand, when the reassociation procedure between the STA MLD and the AP MLD is needed, the reassociation procedure between the STA MLD and the AP MLD may be performed after the indicated link changing time as shown in FIG. 12. When the reassociation procedure is not needed, the STA MLD may transmit an arbitrary frame to the AP MLD after the indicated link changing time.

In this case, when AID information is included in the information element for multi-link negotiation or the information element for changing the primary link, the STA MLD may transmit an arbitrary frame after the indicated time as shown in FIGS. 13 and 14, and the AP may receive a response frame.

Alternatively, after the time indicated in the link appliance timer field, a separate AID may be allocated through a procedure in which the STA MLD transmits an AID request frame and the AP MLD transmits an AID response frame. Alternatively, a process for confirming the procedure for changing the primary link, in which the AP MLD transmits an unrequested AID response frame after the link appliance time and the STA MLD transmits an ACK frame to the AID response frame, and a process for allocating a new AID may be performed.

Meanwhile, through the negotiation procedure between the STA MLD and the AP MLD, a link configuration change procedure for multi-link operation may be performed. However, when the link change procedure is not successfully performed in the STA MLD, the STA MLD and the AP MLD may return to the original link and perform the link negotiation procedure again as shown in FIG. 20.

Figure 20:
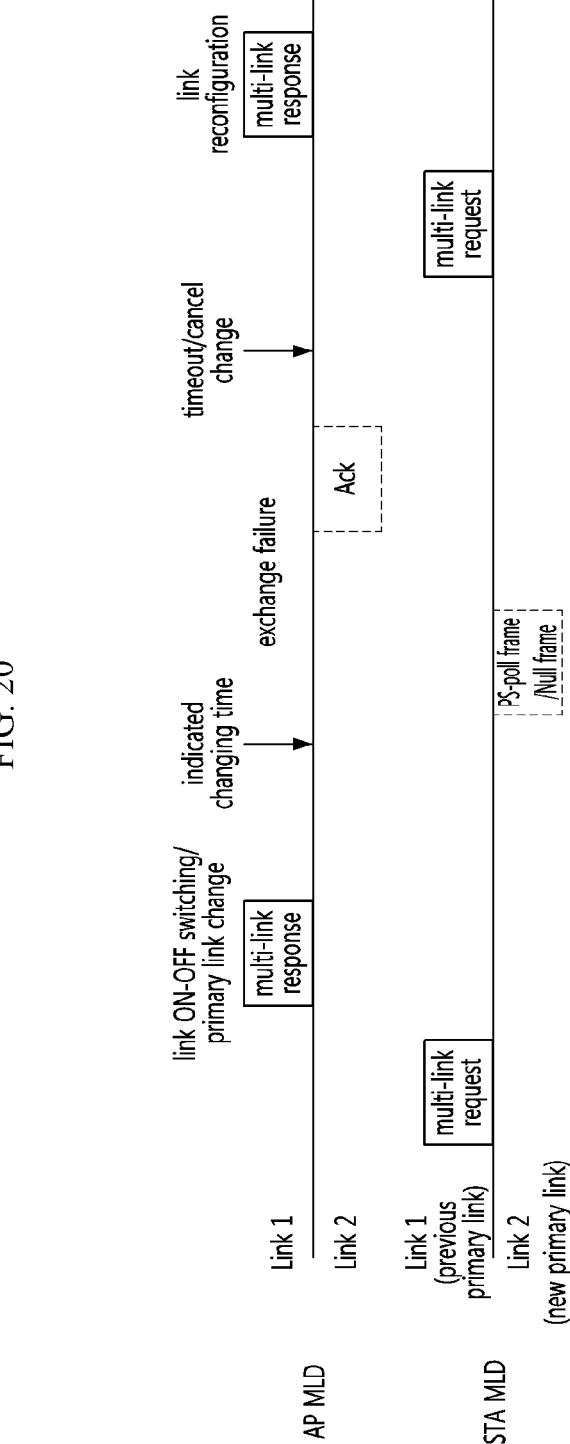
FIG. 20 is a conceptual diagram illustrating an operation in which a link change procedure fails through a frame exchange procedure after link change, when link information used for a multi-link operation is changed through a negotiation procedure between an AP MLD and a STA MLD.

FIG. 20 is a conceptual diagram illustrating an operation in which a link change procedure fails through a frame exchange procedure after link change, when link information used for a multi-link operation is changed through a negotiation procedure between an AP MLD and a STA MLD.

Referring to FIG. 20, when a frame exchange procedure is not performed from the time indicated by the link appliance timer field until the time indicated by the link appliance timeout field expires, the STA MLD may determine that the procedure for changing the corresponding link or the procedure for changing the primary link has failed after the corresponding timeout, and return to the original link.

In this case, the AP MLD may determine that the link change operation of the STA MLD has failed, and may perform the frame exchange operation with the STA MLD through the link before performing the link change procedure.

In this case, information for the primary link change may be identified during the negotiation procedure for multi-link operation of the STA MLD. If the frame exchange procedure is not performed on the changed primary link before the corresponding timeout, the STA MLD may determine that the operation for changing the primary link has failed, and may maintain previous AID information allocated to the STA MLD. Meanwhile, the STA MLD returning to the original link after the corresponding timeout may change the multi-link information again, and may perform the negotiation procedure for changing the primary link again.

On the other hand, differently from that of FIG. 15, the negotiation procedure for multiple links may be performed in a manner in which information on available links of the AP MLD is exchanged in the access procedure between the STA MLD and the AP MLD, and whether to activate the corresponding link is indicated in the negotiation procedure for the multi-link operation.

Figure 21:
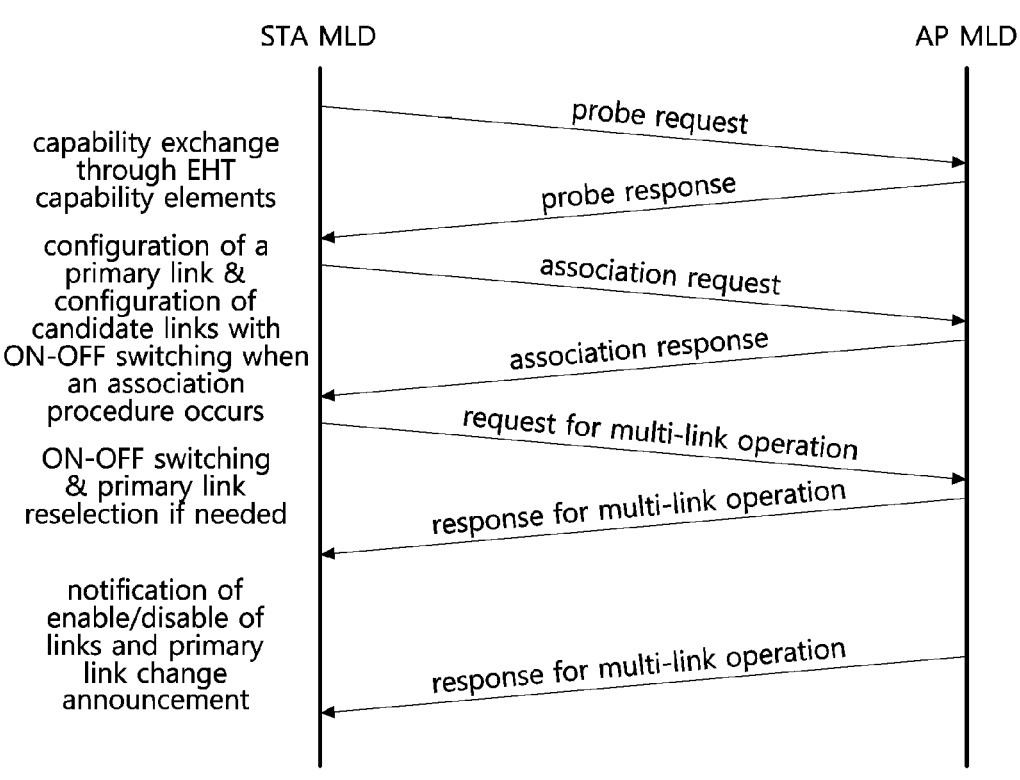
FIG. 21 is a sequence chart illustrating a second exemplary embodiment of a negotiation and change procedure for performing a multi-link operation between an AP MLD and a STA MLD.

FIG. 21 is a sequence chart illustrating a second exemplary embodiment of a negotiation and change procedure for performing a multi-link operation between an AP MLD and a STA MLD.

Referring to FIG. 21, when the negotiation for the multi-link operation between the STA MLD and the AP MLD is performed, the link information used by the AP MLD may not be changed from time to time. In this case, the AP MLD may allocate information on available links of the AP MLD and an ID for each link in the association procedure with the STA MLD. Thereafter, the AP MLD may transmit information on whether each link is activated in the procedure for the multi-link operation.

When the multiple links and the primary link are configured in the above manner, the AP MLD scanning and access procedure at the STA MLD may be performed through the exchange procedure of the probe request/response frames and the exchange procedure of the association request/response frames. Through the above procedure, capability elements (e.g., EHT capability elements including whether or not multi-link related functions are supported) of the STA MLD and the AP MLD may be exchanged. The STA MLD may receive the EHT operation element including multi-link related information from the AP MLD.

In this case, the received EHT operation element may include information on links available in the AP MLD and information on an ID for each link. When the STA MLD performs the association procedure with the AP MLD, the STA MLD may configure a link corresponding to a band in which the association procedure is performed and the primary link as a single link.

After the association procedure between the STA MLD and the AP MLD is performed, a process in which the STA MLD performs negotiation with the AP MLD for multi-link operation may be performed in a manner in which the AP MLD exchanges information on the available links of the AP MLD with the STA MLD. The information on the available links may be information indicating whether the link is activated.

In this case, the negotiation procedure for multi-link activation may be performed through a process in which the STA MLD transmits a multi-link request frame, the AP MLD receive the corresponding request frame, and the AP MLD transmits a multi-link response frame.

The multi-link request frame and the multi-link response frame may be an action frame. In this case, the multi-link request frame transmitted by the STA MLD for multi-link negotiation may include some or all of the information elements of Table 3 below.

TABLE 3

| Information | Description |
|---|---|
| Category | indicates a form of the corresponding action frame, and means an indicator indicating that multi-link related information is included. |
| Multi-link Action | indicates whether the corresponding action frame is a request frame, a response frame, or a teardown frame. |
| Dialog Token | field for matching a response frame to a request frame |
| Multi-link element | information element for multi-link operation |
| Primary Link switch element | information element including primary link change information, when the primary link change information is separately included |
| Link Switch timer element | Information element including link change time, when the link change time is separately included. Channel Switching Timing element may be used. |

After the multi-link request frame is transmitted, the AP MLD may identify information included in the frame. Accordingly, the AP MLD may transmit the multi-link response frame including approval or rejection information for the request from the STA MLD to the STA MLD. The multi-link response frame may include some or all of the information elements of Table 4 below.

TABLE 4

| Information | Description |
|---|---|
| Multi-link Action | indicates whether the corresponding action frame is a request frame, a response frame, or a teardown frame. |
| Dialog Token | field for matching a response frame to a request frame |
| Multi-link element | information element for multi-link operation |
| Primary Link switch element | information element including primary link change information, when the primary link change information is separately included |
| Link Switch timer element | Information element including link change time, when the link change time is separately included. Channel Switching Timing element may be used. |
| TBTT, Beacon Interval | Information element including beacon time information, when the beacon time information is separately included. Beacon Timing element may be used. |

Meanwhile, the exchange procedure of the corresponding action frames may be performed, thereby activating the multi-link operation between the AP MLD and the STA MLD. Thereafter, when the STA MLD wants to change the used link information, the STA MLD may transmit the multi-link request frame again. In addition, the AP MLD may transmit the multi-link response frame including approval or rejection information for the link change operation requested by the STA MLD. Through this process, whether to activate each link may be reconfigured.

When the AP MLD wants to change the link configuration, the AP MLD may change the configuration of the link through transmission of an unrequested multi-link response frame. The multi-link information element included in the multi-link request frame and the multi-link response frame may be configured as shown in FIG. 22.

Figure 22:
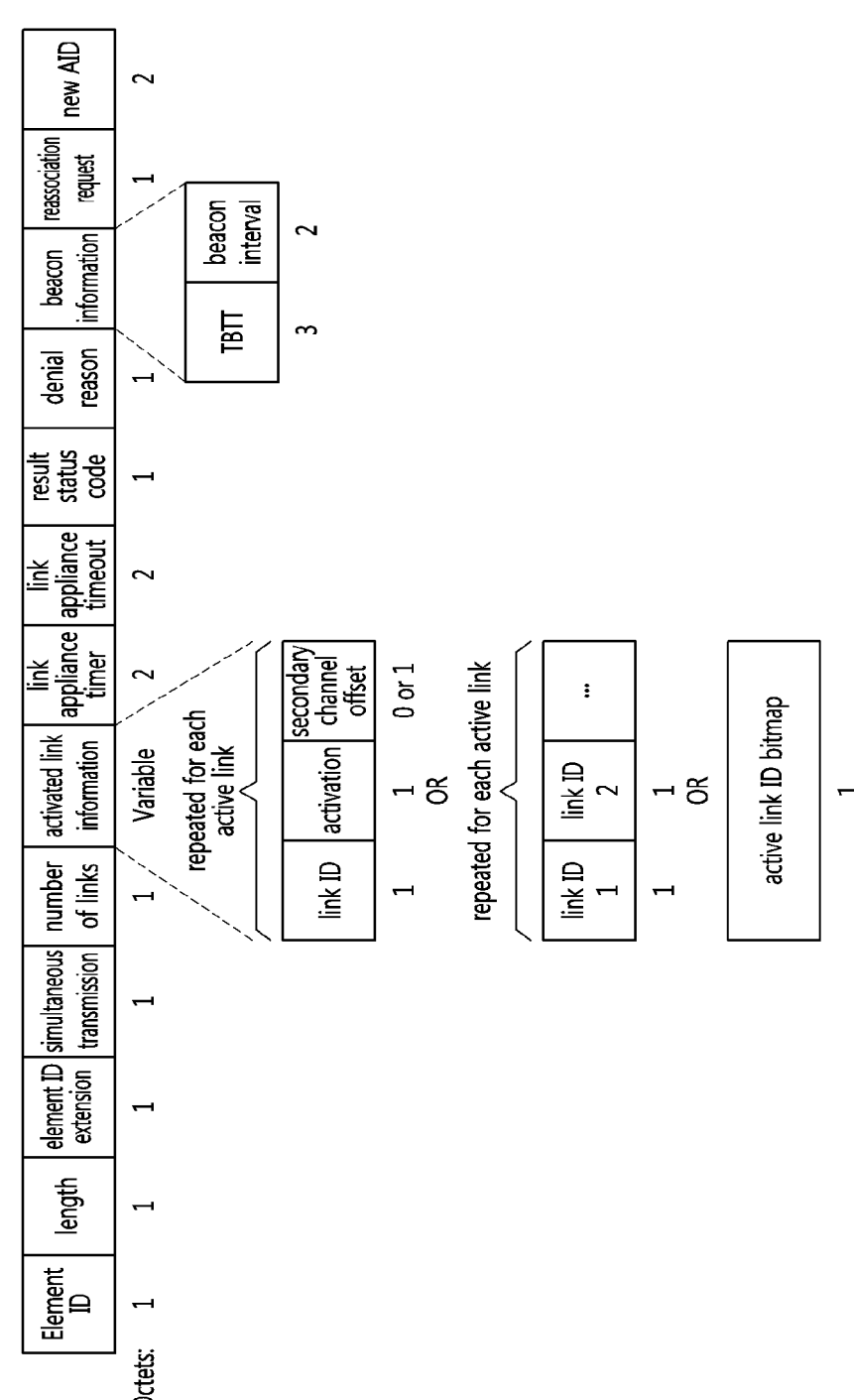
FIG. 22 is a conceptual diagram illustrating a fourth exemplary embodiment of a multi-link information element used in a negotiation procedure for performing a multi-link operation between a STA MLD and an AP MLD when performing the multi-link operation.

FIG. 22 is a conceptual diagram illustrating a fourth exemplary embodiment of a multi-link information element used in a negotiation procedure for performing a multi-link operation between a STA MLD and an AP MLD when performing the multi-link operation.

Referring to FIG. 22, the multi-link information element may include an element ID field, a length field, an element ID extension field, a field indicating whether simultaneous (synchronous) transmission is performed, a field indicating the number of active links, an activated link information field, a link appliance timer field, a link appliance timeout field, a result status code field included in the response frame, a field indicating a denial reason, and the like.

The field indicating whether simultaneous transmission is performed may be a field indicating whether the per-link independent transmission scheme or the simultaneous transmission scheme is used when the transmission operation using multiple links is performed. In this case, when it is indicated by the EHT capability element that two or more transceivers are not included when the STA MLD performs the association process, or when the number of the transceivers included in the STA MLD is smaller than the number of links to be configured, the multi-link operation may be performed in the simultaneous transmission scheme.

Meanwhile, when the STA MLD requests to change the link activation information to use, the STA MLD may transmit the activated link information field by including information of a link ID to be used in the activated link information field. The link appliance timer may include information on a time at which the changed link is to be applied. In this case, the AP MLD may receive a request frame for multi-link operation including the corresponding information from the STA MLD. The AP MLD may transmit the response frame for multi-link operation according to the request frame including information indicating whether to approve or reject the request in the result status code field.

When the request is rejected, the reason for rejecting the request (e.g., when the primary link is congested, when the AP MLD currently has data to transmit to the STA MLD, or the like) may be indicated in the denial reason field.

Meanwhile, the activated link information field may be implemented in various forms. As an exemplary embodiment, the activated link information field may include information on a link ID for each activated link, information on whether it is activated, and information on an extension direction when channel extension is performed. In this case, such the activated link information field may be configured for each link, and thus may be repeated as many times as the number indicated by the field indicating the number of active links.

As another exemplary embodiment, only information on the active links may be described in the activated link information field. In this case, the activated link information field may be configured in a form in which IDs of the activated links are listed. As yet another exemplary embodiment, the activated link information field may be configured as a 1-byte bitmap field. In this case, when a link corresponding to a specific link ID is activated, a position of the bitmap corresponding to the link ID may be set to 1. In this case, a bit located at the frontmost place of the bitmap may indicate whether a link having a link ID of 0 is activated. For example, when links having link IDs 1, 4, and 6 are activated, the corresponding bitmap may be set to '01001010'.

Meanwhile, when information on the primary link is separately included in the multi-link information element, information on the corresponding primary link may be positioned at the frontmost place of the activated link information field. For example, when the multi-link information element includes a link ID for each link, whether each link is activated, and an extension direction when channel extension is performed, the link ID for the primary link, whether the primary link is activated, and the channel extension direction therefor may be indicated at the frontmost place of the activated link information field.

Alternatively, when the activated link information field is configured in the form of listing the IDs of the active links, the link ID of the primary link may be configured to be located at the frontmost place. When the multi-link information element includes information of the primary link, beacon time information may not be separately included when the primary link is not changed. In this case, when the primary link is changed, the multi-link information element may additionally include beacon time information of a beacon transmitted on the changed primary link. When the information element for changing the primary link is separately included in the request and response frames exchanged for the multi-link operation, the information indicating the primary link may not be included in the multi-link information element.

Meanwhile, when the link change time is separately included in the request and response frames exchanged for the multi-link operation, the link appliance timer field and the link appliance timeout field of the multi-link information element may be omitted. On the other hand, when the AP MLD configuring the multiple links manages a BSS for all links in an integrated manner, the AID reassignment procedure may not be necessary even when the primary link is changed. Therefore, the new AID field may not be included in the frame. On the other hand, in case that the corresponding AP MLD separately operates a BSS for each link, when changing the primary link through the multi-link negotiation procedure, the AP MLD may request the STA MLD to perform a reassociation operation. Even if the AP MLD does not request the reassociation operation of the STA MLD, the AP MLD may allocate a new AID to be used in the changed primary link. In this case, a field indicating the above content may be additionally included.

FIG. 23 is a conceptual diagram illustrating a structure of an information element separately including information on a primary link when a negotiation procedure for a multi-link operation is performed in a scheme of activating each link after an association process.

Referring to FIG. 23, the primary link information element may include an element ID field, a length field, an element ID extension field, an after-change primary link information field, a before-change primary link information field, a link appliance timer field, a link appliance timeout field, a beacon time information filed on beacons transmitted on the changed primary link, and the like. The beacon transmission time information may be a target beacon transmission time (TBTT) interval.

When the STA MLD requests to change the primary link, the STA MLD may change the ID of the primary link to be used, and then transmit the primary link information field by including the ID in the primary link information field. Alternatively, the STA MLD may transmit the corresponding field by configuring the corresponding field as 'reserved'.

When the corresponding information element is included in the multi-link response frame, the after-change primary link information field may include an ID of a primary link to be used by the STA MLD after a lapse of the indicated link appliance time after the response frame including the corresponding information element is transmitted. The after-change primary link information field and the before-change primary link information field may include the link ID for the corresponding link, and may further include an indicator additionally indicating whether or not the link is activated.

Meanwhile, when the link change time is separately included in the request and response frames exchanged for the multi-link operation, the link appliance timer field and the link appliance timeout field of the primary link information element may be omitted. Also, when the beacon time information element is separately included, the beacon time information field of the primary link information element may be omitted.

Meanwhile, when the AP MLD configuring the multiple links manages a BSS for all links in an integrated manner, the AID reassignment procedure may not be necessary even if the primary link is changed. Therefore, a new AID field may not be included in the frame. On the other hand, in case that the corresponding AP MLD separately operates a BSS for each link, when changing the primary link through the multi-link negotiation procedure, the AP MLD may request the STA MLD to perform the reassociation operation. Even when the AP MLD does not request the reassociation operation of the STA MLD, the AP MLD may allocate a new AID to be used in the changed primary link. In this case, a field indicating the above content may be additionally included. When there are different parameters from those of the previous primary link in the changed primary link, the AP MLD may transmit information by additionally including the different parameters.

Meanwhile, when the multi-link transmission scheme is a scheme in which channel access to a single primary link is performed, even though another link is in an idle state when the corresponding primary link is in a channel busy state, the operation of transmitting a frame may not be performed. To compensate for this, a method of performing channel access with the same backoff value on a plurality of links may be used in the simultaneous transmission scheme.

Figure 24:
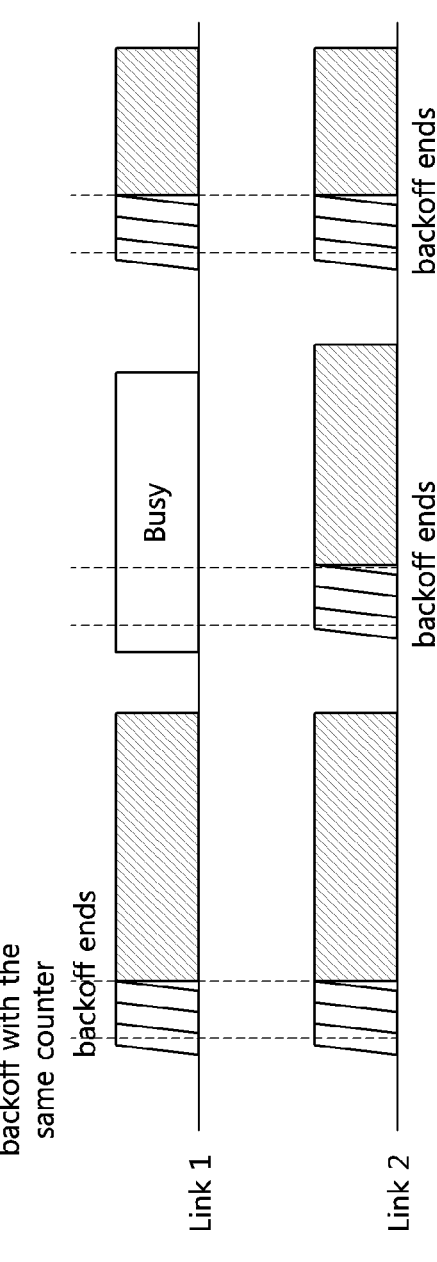
FIG. 24 is a conceptual diagram illustrating a multi-link simultaneous transmission operation in which multiple primary links are used.

FIG. 24 is a conceptual diagram illustrating a multi-link simultaneous transmission operation in which multiple primary links are used.

Referring to FIG. 24, when the transmission scheme using the multiple primary links is performed, a negotiation procedure for multi-link operation may be performed between the STA MLD and the AP MLD. Thereafter, when there is a frame to be transmitted in the STA MLD or the AP MLD, a backoff operation may be performed on both links for the same time.

For example, when the channel access operation is performed based on the EDCA scheme, channel sensing may be performed for a frame to be transmitted for the same AIFS length, and the frame may be transmitted. When it is determined that the states of the plurality of channels are busy during the channel sensing, after the corresponding busy period ends, the channel backoff process may be performed for the plurality of links after waiting for the same AIFS time.

In this case, the length of the backoff performed may be the backoff length according to the EDCA operation. Here, one random backoff value may be determined for the plurality of links, and the same backoff length may be applied to all the links. In this case, the AP MLD may apply the EDCA parameter differently for each link so that each link has a different AIFS value or a different backoff window. In this case, in order to maintain fairness with the existing STAs using the corresponding links, a random backoff value may be determined using a longer AIFS value and a larger window value. Thereafter, the channel access operation may be performed by applying the corresponding value to the plurality of links.

On the other hand, when a busy channel is detected in some links among the configured multiple links while the channel access operation is being performed, the communication node may perform the channel access operation for the remaining links and transmit the frame using only the corresponding links. In this case, if the channel states for the remaining links become busy states while performing the channel access operation on the corresponding links, the communication node may need to wait until the channels for all the links become idle. Thereafter, when the backoff process is performed, the channel access operation for all the links may be performed by applying a length corresponding to a backoff value having a higher value among the remaining backoff parameters.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of a first device supporting multi-links in a communication system, the operation method comprising:
   performing a monitoring operation for receiving a management frame using a first link which is a primary link among the multi-links;
   receiving the management frame from a first access point (AP) affiliated with a second device through the monitoring operation;
   identifying information of a second link supported by the second device among the multi-links from the management frame;
   receiving a first frame including information of a fourth link which is a new primary link from the first AP; and
   changing the primary link from the first link to the fourth link,
   wherein the primary link is used for transmitting and receiving the management frame with the second device, and the information of the fourth link includes a link appliance timer field which indicates a time at which the primary link is changed to be the new primary link and a field indicating a bandwidth extension direction of the new primary link.

2. The operation method according to claim 1, wherein the management frame is a beacon frame or a probe response frame.

3. The operation method according to claim 1, wherein the information of the second link includes a target beacon transmission time (TBTT) information field for a second AP which is affiliated with the second device and operates in the second link.

4. The operation method according to claim 1, wherein the information of the second link includes an identifier of the second link.

5. The operation method according to claim 1, wherein the first link is a link in which an association procedure between the first device and the second device is performed.

6. The operation method according to claim 1, further comprising receiving information of a third link of a third AP affiliated with the second device from the second device after establishing the multi-links.

7. The operation method according to claim 1, wherein the management frame further includes information of a third link supported by the second device among the multi-links, and the information of the third link includes a TBTT information field for a third AP which is affiliated with the second device and operates in the third link and an identifier of the third link.

8. An operation method of a second device supporting multi-links in a communication system, the operation method comprising:
   generating a management frame including information of a second link supported by the second device among the multi-links;
   transmitting the management frame using a first link which is a primary link among the multi-links;
   configuring a fourth link as a new primary link; and
   announcing a probe response frame including information of the fourth link to the first device,
   wherein the primary link is used for transmitting and receiving the management frame with the first device, and the information of the fourth link includes a link appliance timer field which indicates a time at which the primary link is changed to be the new primary link and a field indicating a bandwidth extension direction of the new primary link.

9. The operation method according to claim 8, wherein the management frame is a beacon frame or the probe response frame.

10. The operation method according to claim 8, wherein the information of the second link includes a target beacon transmission time (TBTT) information field for a second AP which is affiliated with the second device and operates in the second link.

11. The operation method according to claim 8, wherein the information of the second link includes an identifier of the second link.

12. The operation method according to claim 8, wherein the first link is a link in which an association procedure between the first device and the second device is performed.

13. The operation method according to claim 8, wherein the management frame further includes information of a third link supported by the second device among the multi-links, and the information of the third link includes a TBTT information field for a third AP which is affiliated with the second device and operates in the third link and an identifier of the third link.

14. The operation method according to claim 1, further comprising establishing the multi-links including the first link and the second link with the second device.

15. The operation method according to claim 8, further comprising establishing the multi-links including the first link and the second link with a first device receiving the management frame.

\* \* \* \* \*